(12) United States Patent
Basu Mallick et al.

(10) Patent No.: US 10,425,346 B2
(45) Date of Patent: *Sep. 24, 2019

(54) EFFICIENT DISCARD MECHANISM IN SMALL CELL DEPLOYMENT

(71) Applicant: Sun Patent Trust, New York, NY (US)

(72) Inventors: Prateek Basu Mallick, Langen (DE); Joachim Loehr, Langen (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,750

(22) Filed: Mar. 15, 2018

(65) Prior Publication Data

US 2018/0205661 A1     Jul. 19, 2018

Related U.S. Application Data

(63) Continuation of application No. 14/906,888, filed as application No. PCT/EP2014/065806 on Jul. 23, 2014, now Pat. No. 9,954,789.

(30) Foreign Application Priority Data

Jul. 24, 2013   (EP) ..................................... 13177864
May 9, 2014    (EP) ..................................... 14167783

(51) Int. Cl.
*H04L 12/823*     (2013.01)
*H04W 28/06*     (2009.01)
(Continued)

(52) U.S. Cl.
CPC ............ *H04L 47/32* (2013.01); *H04L 47/564* (2013.01); *H04W 16/32* (2013.01); *H04W 28/06* (2013.01); *H04W 28/08* (2013.01)

(58) Field of Classification Search
None
See application file for complete search history.

(56) References Cited

U.S. PATENT DOCUMENTS 8,565,128 B2   10/2013   Guo
8,797,998 B2    8/2014   Wang et al.
(Continued)

FOREIGN PATENT DOCUMENTS

CN       101389119 A        3/2009
CN       101686574 A        3/2010
(Continued)

OTHER PUBLICATIONS

Notice of Reasons for rejection, dated Jun. 12, 2018, for Japanese Application No. 2016-528520, 12 pages.
(Continued)

*Primary Examiner* — Diane L Lo
(74) *Attorney, Agent, or Firm* — Seed IP Law Group LLP

(57) ABSTRACT

The invention relates to a method for efficiently discarding data packets destined to a mobile station connected to both a master base station and a secondary base station. The master base station configures a secondary discard function in a lower layer of the secondary base station, based on the master discard function in the higher layer of the master base station. The master base station forwards the data packet from the higher layer to the lower of the secondary base station. The secondary discard function of the lower layer at the secondary base station discards the received data packet upon expiry of the secondary timer started by the lower layer upon reception of the data packet from the higher layer at the master base station.

6 Claims, 22 Drawing Sheets

(51) Int. Cl.
*H04W 28/08* (2009.01)
*H04L 12/875* (2013.01)
*H04W 16/32* (2009.01)

(56) References Cited

U.S. PATENT DOCUMENTS

| | | | |
|---|---|---|---|
| 8,848,661 | B2 | 9/2014 | Wang et al. |
| 9,954,789 | B2 * | 4/2018 | Basu Mallick ....... H04W 28/06 |
| 2010/0080185 | A1 | 4/2010 | Guo |
| 2010/0110971 | A1 | 5/2010 | Kim et al. |
| 2010/0177736 | A1 | 7/2010 | Wang et al. |
| 2010/0322197 | A1 | 12/2010 | Adjakple et al. |
| 2011/0286416 | A1 | 11/2011 | Wang et al. |
| 2012/0170445 | A1 | 7/2012 | Perumanam et al. |
| 2014/0056243 | A1 | 2/2014 | Pelletier et al. |
| 2014/0301367 | A1 | 10/2014 | Wang et al. |
| 2015/0351139 | A1 | 12/2015 | Zhang et al. |
| 2016/0094446 | A1 | 3/2016 | Kazmi et al. |

FOREIGN PATENT DOCUMENTS

| | | |
|---|---|---|
| CN | 101772146 A | 7/2010 |
| CN | 101997660 A | 3/2011 |
| CN | 102790998 A | 11/2012 |
| JP | 2012-507970 A | 3/2012 |
| WO | 2010/105467 A1 | 9/2010 |

OTHER PUBLICATIONS

NSN, Nokia Corporation, "PDCP window handling for split bearers," R2-142087 (revision of R2-141178), 3GPP TSG-RAN WG2 Meeting #86, Agenda Item: 7.1.4, Seoul, South Korea, May 19-23, 2014, 11 pages.
Chinese Office Action, dated Jul. 4, 2018, for corresponding Chinese Application No. 201480050619.1, 89 pages (With English Translation).
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)," Sep. 2012, 39 pages.
3GPP TS 36.323 V11.2.0, "3rd Generation Partnership Project; Technical Specification Group Radio Access Network; Evolved Universal Terrestrial Radio Access (E-UTRA); Packet Data Convergence Protocol (PDCP) specification (Release 11)," Mar. 2013, 27 pages.
3GPP TR 36.842 V0.2.0, "3rd Generation Partnership Project; Technical Specification Group Radio Access Network; Evolved Universal Terestrial Radio Access (E-UTRA); Study on Small Cell Enhancement for E-UTRA and E-UTRAN—Higher layer aspects (Release 12)," May 2013, 38 pages.
3GPP TR 36.932 V12.1.0, "3rd Generation Partnership Project; Technical Specification Group Radio Access Network; Scenarios and requirements for small cell enhancements for E-UTRA and E-UTRAN (Release 12)," Mar. 2013, 14 pages.
Ericsson, "PDCP reordering in dual connectivity," Tdoc R2-141544, 3GPP TSG-RAN WG2 #85bis, Agenda Item: 7.1.2, Valencia, Spain, Mar. 31-Apr. 4, 2014, 11 pages.
Extended European Search Report dated Jan. 30, 2014, for corresponding EP Application No. 13177864.9-1858, 12 pages.
Extended European Search Report dated Sep. 30, 2014, for corresponding EP Application No. 14167783.1-1854, 10 pages.
Extended European Search Report dated Sep. 28, 2017, for related European Patent Application No. 17173871.9-1854, 14 pages.
Intel Corporation, "PdDCP reordering for option 3C in dual connectivity", R2-140269, 3GPP TSG RAN WG2 Meeting #85, Agenda Item: 7.2.1, Prague, Czech Republic, Feb. 10-14, 2014, 3 pages.
InterDigital Communications, "User Plane Architecture for Dual-Connectivity," R2-131939, 3GPP TSG-RAN WG2 #82, Agenda Item: 7.2.2.1, Fukuoka, Japan, May 20-24, 2013, 7 pages.
International Search Report dated Sep. 26, 2014, for corresponding International Application No. PCT/EP2014/065806, 2 pages.
Nokia Siemens Networks (Rapporteur), "Email Discussion Report on U-Plane Alternatives [81bis#19]," R2-131621, 3GPP TSG-RAN WG2 Meeting #82, Agenda Item: 7.2.2.1, Fukuoka, Japan, May 20-24, 2013, 40 pages.
Sesia et al., "LTE The UMTS Long Term Evolution—From Theory to Practice," WILEY, 2009, chs. 4.2.2-4.2.4, 4.3.1, 9 pages.

* cited by examiner

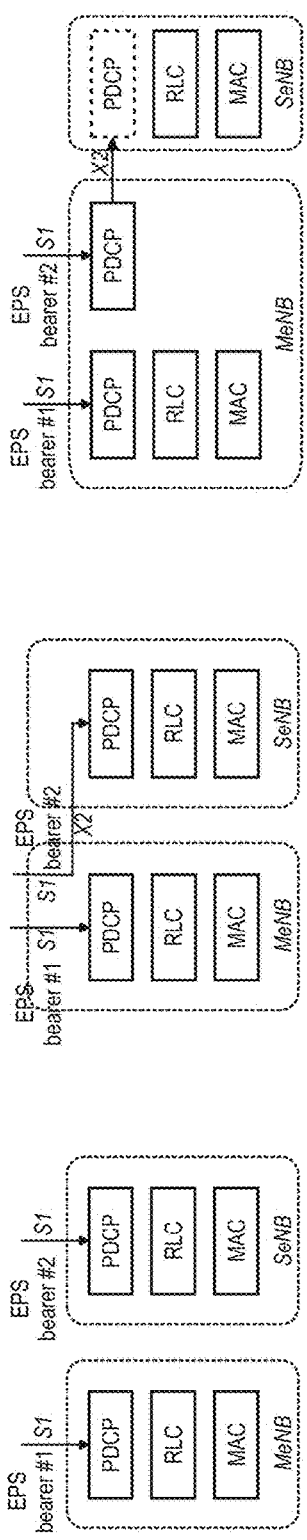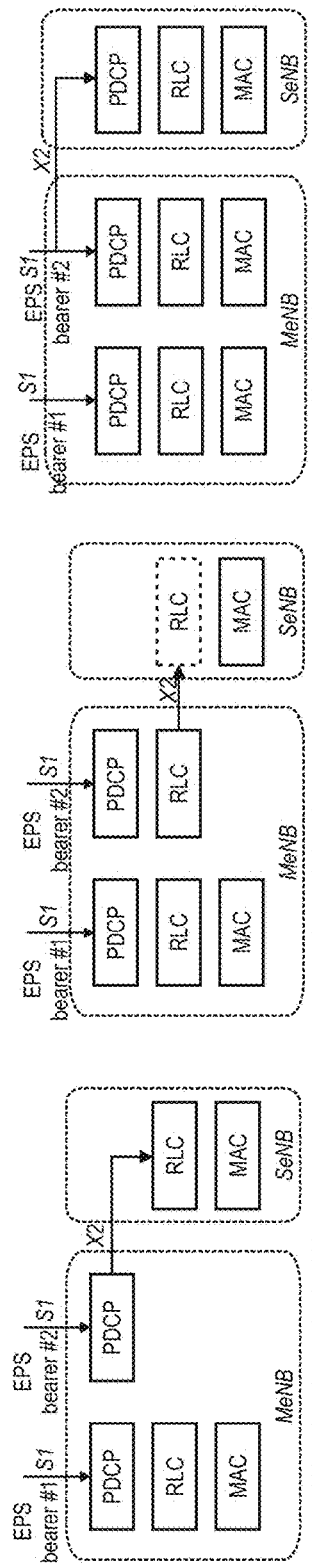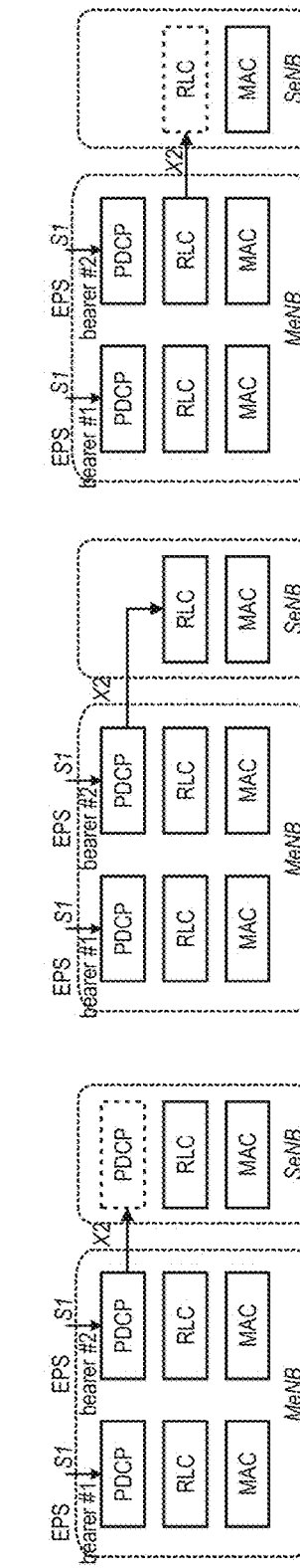

EFFICIENT DISCARD MECHANISM IN SMALL CELL DEPLOYMENT

BACKGROUND

Technical Field

The present disclosure relates to methods for discarding data packets for a mobile station connected to two base stations at the same time. The present disclosure is also providing the base stations for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networksthat provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

1. For each SCell the usage of uplink resources by the UE, in addition to the downlink ones is configurable; the number of DL SCCs configured is therefore always larger or equal to the number of UL SCCs, and no SCell can be configured for usage of uplink resources only 2. The uplink PCell is used for transmission of Layer 1 uplink control information 3. The downlink PCell cannot be de-activated, unlike SCells 4. From UE perspective, each uplink resource only belongs to one serving cell 5. The number of serving cells that can be configured depends on the aggregation capability of the UE 6. Re-establishment is triggered when the downlink PCell experiences Rayleigh fading (RLF), not when downlink SCells experience RLF 7. The downlink PCell cell can change with handover (i.e., with security key change and RACH procedure)

8. Non-access stratum information is taken from the downlink PCell

9. PCell can only be changed with handover procedure (i.e., with security key change and RACH procedure)

10. PCell is used for transmission of PUCCH

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

General Overview of the OSI Layer

FIG. 7 provides a brief overview on the OSI model on which the further discussion of the LTE architecture is based and based on which also the invention will be discussed herein.

The Open Systems Interconnection Reference Model (OSI Model or OSI Reference Model) is a layered abstract description for communication and computer network protocol design. The OSI model divides the functions of a system into a series of layers. Each layer has the property that it only uses the functions of the layer below, and only exports functionality to the layer above. A system that implements protocol behavior consisting of a series of these layers is known as a 'protocol stack' or 'stack'. Its main feature is in the junction between layers which dictates the specifications on how one layer interacts with another. This means that a layer written by one manufacturer can operate with a layer from another. For our purpose, only the first three layers will be described in more detail below.

The physical layer or layer 1's main purpose is the transfer of information (bits) over a specific physical medium (e.g., coaxial cables, twisted pairs, optical fibers, air interface, etc.). It converts or modulates data into signals (or symbols) that are transmitted over a communication channel.

The purpose of the data link layer (or Layer 2) is to shape the information flow in a way compatible with the specific physical layer by breaking up the input data into data frames (Segmentation And Re-assembly (SAR) functions). Furthermore, it may detect and correct potential transmission errors by requesting a retransmission of a lost frame. It typically provides an addressing mechanism and may offer flow control algorithms in order to align the data rate with the receiver capacity. If a shared medium is concurrently used by multiple transmitters and receivers, the data link layer typically offers mechanisms to regulate and control access to the physical medium.

As there are numerous functions offered by the data link layer, the data link layer is often subdivided into sublayers (e.g., RLC and MAC sublayers in UMTS). Typical examples of Layer 2 protocols are PPP/HDLC, ATM, frame relay for fixed line networks and RLC, LLC or MAC for wireless systems. More detailed information on the sublayers PDCP, RLC and MAC of layer 2 is given later.

The network layer or Layer 3 provides the functional and procedural means for transferring variable length packets from a source to a destination via one or more networks while maintaining the quality of service requested by the transport layer. Typically, the network layer's main purposes are inter alia to perform network routing, network fragmentation and congestion control functions. The main examples of network layer protocols are the IP Internet Protocol or X.25.

With respect to Layers 4 to 7 it should be noted that depending on the application and service it is sometimes difficult to attribute an application or service to a specific layer of the OSI model since applications and services operating above Layer 3 often implement a variety of functions that are to be attributed to different layers of the OSI model. Therefore, especially in TCP(UDP)/IP based networks, Layer 4 and above is sometimes combined and forms a so-called "application layer".

Layer Services and Data Exchange

In the following the terms service data unit (SDU) and protocol data unit (PDU) as used herein are defined in connection with FIG. 8. In order to formally describe in a generic way the exchange of packets between layers in the OSI model, SDU and PDU entities have been introduced. An SDU is a unit of information (data/information block) transmitted from a protocol at the layer N+1 that requests a service from a protocol located at layer N via a so-called service access point (SAP). A PDU is a unit of information exchanged between peer processes at the transmitter and at the receiver of the same protocol located at the same layer N.

A PDU is generally formed by a payload part consisting of the processed version of the received SDU(s) preceded by a layer N specific header and optionally terminated by a trailer. Since there is no direct physical connection (except for Layer 1) between these peer processes, a PDU is forwarded to the layer N−1 for processing. Therefore, a layer N PDU is from a layer N−1 point of view an SDU.

LTE Layer 2—User Plane Protocol Stack

The LTE layer 2 user-plane protocol stack is composed of three sublayers as shown in FIG. 9, PDCP, RLC and MAC. As explained before, at the transmitting side, each layer receives a SDU from a higher layer for which the layer provides a service and outputs a PDU to the layer below. The RLC layer receives packets from the PDCP layer. These packets are called PDCP PDUs from a PDCP point of view and represent RLC SDUs from an RLC point of view. The RLC layer creates packets which are provided to the layer below, i.e., the MAC layer. The packets provided by RLC to the MAC layer are RLC PDUs from an RLC point of view and MAC SDUs from a MAC point of view.

At the receiving side, the process is reversed, with each layer passing SDUs up to the layer above, where they are received as PDUs.

While the physical layer essentially provides a bitpipe, protected by turbo-coding and a cyclic redundancy check (CRC), the link-layer protocols enhance the service to upper layers by increased reliability, security and integrity. In addition, the link layer is responsible for the multi-user medium access and scheduling. One of the main challenges for the LTE link-layer design is to provide the required reliability levels and delays for Internet Protocol (IP) data flows with their wide range of different services and data rates. In particular, the protocol over-head must scale. For example, it is widely assumed that voice over IP (VoIP) flows can tolerate delays on the order of 100 ms and packet losses of up to 1 percent. On the other hand, it is well-known that TCP file downloads perform better over links with low bandwidth-delay products. Consequently, downloads at very high data rates (e.g., 100 Mb/s) require even lower delays and, in addition, are more sensitive to IP packet losses than VoIP traffic.

Overall, this is achieved by the three sublayers of the LTE link layer that are partly intertwined.

The Packet Data Convergence Protocol (PDCP) sublayer is responsible mainly for IP header compression and ciphering. In addition, it supports lossless mobility in case of inter-eNB handovers and provides integrity protection to higher layer-control protocols.

The radio link control (RLC) sublayer comprises mainly ARQ functionality and supports data segmentation and concatenation. The latter two minimize the protocol overhead independent of the data rate.

Finally, the medium access control (MAC) sublayer provides HARQ and is responsible for the functionality that is required for medium access, such as scheduling operation and random access. FIG. 10 exemplary depicts the data flow of an IP packet through the link-layer protocols down to the physical layer. The figure shows that each protocol sublayer adds its own protocol header to the data units.

Packet Data Convergence Protocol (PDCP)

The PDCP layer processes Radio Resource Control (RRC) messages in the control plane and IP packets in the user plane. Depending on the radio bearer, the main functions of the PDCP layer are:

header compression and decompression for user plane data

Security functions:
  Ciphering and deciphering for user plane and control plane data
  Integrity protection and verification for control plane data Handover support functions:
  In-sequence delivery and reordering of PDUs for the layer above at handover;
  Lossless handover for user plane data mapped on RLC Acknowledged Mode (AM)

Discard for user plane data due to timeout.

The PDCP layer manages data streams in the user plane, as well as in the control plane, only for the radio bearers using either a Dedicated Control Channel (DCCH) or a Dedicated Transport Channel (DTCH). The architecture of the PDCP layer differs for user plane data and control plane data, as shown in FIGS. 11 and 12. Two different types of PDCP PDUs are defined in LTE: PDCP Data PDUs and PDCP Control PDUs. PDCP Data PDUs are used for both control and user plane data. PDCP Control PDUs are only used to transport the feedback information for header compression, and for PDCP status reports which are used in case of handover and hence are only used within the user plane.

Due to the low relevance to the invention, the functions Header Compression, Security and Handover are not explained in detail; details in said respect can be found in LTE—The UMTS Long Term Evolution FROM THEORY TO PRACTICE, Edited by: Stefania Sesia, Issam Toufik, Matther Baker, Second Edition, ISBN 978-0-470-66025-6, Chapters 4.2.2, 4.2.3 and 4.2.4 incorporated herein by reference.

On the other hand, the discarding of data packets will be explained in the following in detail. The PDCP layer in general and discarding in the PDCP layer in particular is defined in 3GPP TS 36.323 v11.2.0 (2013-03), incorporated herein by reference.

In the context of this invention the term "discarding" shall not be understood in its strictest sense as deleting the packet right away, but shall more broadly cover the concept of indicating the packet (e.g., the PDCP PDU/SDUs) as not being necessary anymore and thus should to be deleted. The technical standard leaves open at which particular point in time the PDCP PDU/SDUs are actually deleted (it only specifies when they shall be discarded), since the buffer management is mostly left to the technical implementation. Therefore, after a packet is "discarded", it may be that according to one technical implementation the packet is deleted immediately or according to another technical implementation that the buffer is emptied periodically by deleting those packets that are indicated as discarded. Typically, the data rate that is available on the radio interface is smaller than the data rate available on the network interfaces. Thus, when the data rate of a given service is higher than the data rate provided by the LTE radio interface, buffering in the UE and in the eNodeB is the result. This buffering allows the scheduler in the MAC layer some freedom to vary the instantaneous data rate at the physical layer in order to adapt to the current radio channel conditions. Thanks to the buffering, the variations in the instantaneous data rate are then seen by the application only as some jitter in the transfer delay.

However, when the data rate provided by the application exceeds the data rate provided by the radio interface for a long period of time, large amounts of buffered data can result. This may lead to a large loss of data at handover if lossless handover is not applies to the bearer, or to an excessive delay for real time applications.

In order to e.g., prevent excessive delay, a discard function is included in the PDCP layer for LTE. This discard function is based on a timer, where for each PDCP SDU received from the higher layers in the transmitter a timer ("discardTimer") is started.

Also, the PDCP layer continues generating the PDCP PDU out of the higher layer PDCP SDU, and once generated, forwards the generated PDCP PDU to the lower layer, RLC.

The standard TS 36.323 Chapter 5.4 describes that, when the timer expires for a PDCP SDU, or the successful delivery of a PDCP SDU is confirmed by the PDCP status report, the UE shall discard the PDCP SDU along with the corresponding PDCP PDU.

The PDCP status report is sent in connection with a handover of the mobile station from a base station to another base station. Although not explicitly specified by the 3GPP standardization and thus left for technical implementation, the PDCP PDU and SDU shall also be deleted by the PDCP layer after the PDCP PDU was successfully forwarded to the UE; in particular, after the PDCP PDU was forwarded to the RLC and successful delivered to the UE by the RLC (more general, and not in connection with a handover; which can be indicated by the RLC layer), but before the expiry of the timer. In that case also the timer which is specific to the PDCP SDU (and thus to the PDCP PDU) shall be aborted/deleted/stopped.

However, when the timer expires for a PDCP SDU, a successful delivery of the PDCP SDU to the UE could not yet be achieved. As stated by the standard TS 36.323, the PDCP layer discards the PDCP SDU and PDCP PDU and indicates the discard for the particular PDCP PDU to the lower layer, RLC.

When indicated from upper layer (i.e., PDCP) to discard a particular RLC SDU, the transmitting side of an AM RLC entity or the transmitting UM RLC entity (see later chapter) shall discard the indicated RLC SDU if no segment of the RLC SDU has been mapped to a RLC data PDU yet (see 3GPP TS 36.322 Chapter 5.3).

The PDCP layer discards the packets based on the "discardTimer", which can be for example set according to the certain delay requirements given by the required QoS of the radio bearer. For instance, a packet does not need to be transmitted in case it is too late for the service. This discard mechanism can thus prevent excessive delay and queuing in the transmitter.

The peer PDCP entity is not informed since RLC layer takes care of the in-sequence delivery. The peer PDCP entity does not wait for any PDCP packet that is not received.

The discard mechanism of the PDCP layer is illustrated exemplary in FIG. 13, which is a simplified flow diagram for the processing of a PDCP SDU and the corresponding discard of the PDCP SDU and PDCP PDU based on the discardTimer as defined by 3GPP. As apparent therefrom, the deletion of successfully-delivered PDCP PDU/SDUs is omitted from the figure, since this is only of low relevance to the discard mechanism which is the focus of the this invention.

PDCP PDUs for user plane data comprise a "D/C" field in order to distinguish Data and Control PDUs, the formats of which are shown in FIGS. 14 and 15 respectively. PDCP Data PDUs comprise a 7- or 12-bit sequence number (SN). PDCP Data PDUs for user plane data contain either an uncompressed (if header compression is not used) or a compressed IP packet. PDCP Data PDUs for control plane data (e.g., RRC signaling) comprise a MAC-I field of 32-bit length for integrity protection. PDCP Data PDUs for control plane data contain one complete RRC message.

PDCP Control PDUs are used by PDCP entities handling user plane data. There are two types of PDCP Control PDUs, distinguished by the PDU Type field in the PDCP header. PDCP Control PDUs carry wither PDCP "Status Reports" for the case of lossless handover, or ROHC feedback created by the ROHC header compression protocol. PDCP Control PDUs carrying ROHC feedback are used for user plane radio bearers mapped on either RLC UM or RLC AM, while PDCP control PDUs carrying PDCP Status Reports are used only for user plane radio bearers mapped on RLC AM.

A PDCP Control PDU carrying a PDCP Status Report for the case of lossless handover is used to prevent the retransmission of already-correctly-received PDCP SDUs, and also to request retransmission of PDCP SDUs which were correctly received but for which header decompression failed. This PDCP Control PDU contains a bitmap indicating which PDCP SDUs need to be retransmitted and a reference SN, the First Missing SDU (FMS). In the case that all PDCP SDUs have been received in sequence, this field indicates the next expected SN, and no bitmap is included.

Radio Link Control (RLC)

The RLC layer is located between the PDCP layer (the "upper" layer, from RLC perspective) and the MAC layer (the "lower" layer", from RLC perspective). It communicates with the PDCP layer through a Service Access Point (SAP) and with the MAC layer via logical channels. The RLC layer reformats PDCP PDUs (i.e., RLC SDUs) in order to fit them into the size indicated by the MAC layer; i.e., the RLC transmitter segments and/or concatenates the PDCP PDUs, and the RLC receiver reassembles the RLC PDUs to reconstruct the PDCP PDUs. In addition, the RLC reorders the RLC PDUs if they are received out of sequence due to the HARQ operation performed in the MAC layer.

The functions of the RLC layer are performed by "RLC entities". An RLC entity is configured in one of three data transmission modes: Transparent Mode (TM), Unacknowledged Mode (UM) and Acknowledged Mode (AM). IN AM, special functions are defined to support retransmission.

The main functions of UM RLC can be summarized as follows: Segmentation and concatenation of RLC SDUs (i.e., PDCP PDUs); reordering of RLC PDUs; Duplicate detection of RLC SDUs; Reassembly of RLC SDUs.

The main functions of AM RLC can be summarized as follows: Retransmission of RLC Data PDUs; Re-Segmentation of retransmitted RLC Data PDUs; Polling; Status Reporting; Status Prohibit.

More information on RLC is given by Chapter 4.3.1 of LTE—The UMTS Long Term Evolution FROM THEORY TO PRACTICE, Edited by: Stefania Sesia, Issam Toufik, Matther Baker, Second Edition, ISBN 978-0-470-66025-6, incorporated herein by reference.

Segmentation and concatenation is an important function of the UM and AM RLC entities. The transmitting UM/AM RLC entity performs segmentation and/or concatenation on RLC SDUs received from upper layers, to form RLC PDUs. The size of the RLC PDU at each transmission opportunity is decided and notified by the MAC layer depending on the radio channel conditions and the available transmission resources; therefore, the size of each transmitted RLC PDU can be different. The transmitting UM/AM RLC entity includes RLC SDUs into an RLC PDU in the order in which the y arrive at the UM/AM RLC entity. Therefore, a single RLC PDU can contain RLC SDUs or segments of RLC SDUs.

After segmentation and/or concatenation of RLC SDUs, the transmitting UM/AM RLC entity includes relevant RLC headers in the RLC PDU to indicate the sequence number of the RLC PDU, and additionally the size and boundary of each included RLC SDU or RLC SDU segment. It should be noted that the RLC sequence number is independent from the sequence number added by the PDCP.

As already mentioned above, when indicated from the upper layer (i.e., PDCP) to discard a particular RLC SDU, the transmitting side of an AM RLC entity or the transmitting UM RLC entity shall discard the indicated RLC SDU if no segment of the RLC SDU has been mapped to a RLC data PDU yet (see 3GPP TS 36.322 Chapter 5.3). The decision as to whether the RLC SDU was already "mapped to a RLC data PDU" can be regarded as meaning:

Received at the RLC layer, and

Relevant Header information added (and submitted/ready-to-be-submitted to lower layer)

Small Cells

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G system. Nevertheless, the anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user terminals—is a key to improving traffic capacity and extending the achievable user-data rates of a wireless communication system.

In addition to straightforward densification of a macro deployment, network densification can be achieved by the deployment of complementary low-power nodes respectively small cells under the coverage of an existing macro-node layer. In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes respectively small cells as well as heterogeneous deployments has been possible since the first release of LTE. In this regard, a number of solutions have been specified in recent releases of LTE (i.e., Release-10/11). More specifically, these releases introduced additional tools to handle inter-layer interference in heterogeneous deployments. In order to further optimize performance and provide cost/energy-efficient operation, small cells require further enhancements and in many cases need to interact with or complement existing macro cells. Such solutions will be investigated during the further evolution of LTE—Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Some deployment scenarios assumed in this study item on small cell enhancements will be discussed below. In the following scenarios, the backhaul technologies categorized as non-ideal backhaul in TR 36.932 are assumed.

Both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying) should be studied. The performance-cost trade-off should be taken into account.

A categorization of non-ideal backhaul based on operator inputs is listed in the table below:

| Backhaul Technology | Latency (One way) | Throughput | Priority (1 is the highest) |
|---|---|---|---|
| Fiber Access 1 | 10-30 ms | 10M-10 Gbps | 1 |
| Fiber Access 2 | 5-10 ms | 100-1000 Mbps | 2 |
| Fiber Access 3 | 2-5 ms | 50M-10 Gbps | 1 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps typical, maybe up to Gbps range | 1 |

Fiber access which can be used to deploy Remote Radio Heads (RRHs) is not assumed in this study. HeNBs are not precluded, but not distinguished from Pico eNBs in terms of deployment scenarios and challenges even though the transmission power of HeNBs is lower than that of Pico eNBs. The following 3 scenarios are considered.

Scenario #1 is illustrated in FIG. 16 and is the deployment scenario where macro and small cells on the same carrier frequency (intra-frequency) are connected via a non-ideal backhaul. User are distributed both for outdoor and indoor.

Scenario #2 is illustrated in FIGS. 17 and 18 and refers to a deployment scenario where macro and small cells on different carrier frequencies (inter-frequency) are connected via a non-ideal backhaul. User are distributed both for outdoor and indoor. There are essentially two different scenarios #2, referred herein as 2a and 2b, the difference being that in scenario 2b an indoor small cell deployment is considered.

Scenario #3 is illustrated in FIG. 19 and refers to a deployment scenario where only small cells on one or more carrier frequencies are connected via a non-ideal backhaul link.

Depending on the deployment scenario, different challenges/problems exist which need to be further investigated. During the study item phase such challenges have been identified for the corresponding deployment scenarios and captured in TS 36.842; more details on those challenges/problems can be found there.

In order to resolve the identified challenges which are described in section 5 of TS36.842, the following design goals are taken into account for this study in addition to the requirements specified in TR 36.932.

In terms of mobility robustness:

For UEs in RRC_CONNECTED, Mobility performance achieved by small cell deployments should be comparable with that of a macro-only network.

In terms of increased signaling load due to frequent handover:

Any new solutions should not result in excessive increase of signaling load towards the Core Network. However, additional signaling and user plane traffic load caused by small cell enhancements should also be taken into account.

In terms of improving per-user throughput and system capacity:

Utilizing radio resources across macro and small cells in order to achieve per-user throughput and system capacity similar to ideal backhaul deployments while taking into account QoS requirements should be targeted.

Dual Connectivity

One promising solution to the problems which are currently under discussion in 3GPP RAN working groups is the so-called "dual connectivity" concept. The term "dual connectivity" is used to refer to an operation where a given UE consumes radio resources provided by at least two different network nodes connected with a non-ideal backhaul. Essentially, the UE is connected with both a macro cell (macro eNB) and small cell (secondary or small eNB). Furthermore, each eNB involved in dual connectivity for a UE may assume different roles. Those roles do not necessarily depend on the eNB's power class and can vary among UEs.

Since the study Item is currently at a very early stage, details on the dual connectivity are not decided yet. For example the architecture has not been agreed on yet. Therefore, many issues/details, e.g., protocol enhancements, are still open currently. FIG. 20 shows an exemplary architecture for dual connectivity. It should be only understood as one potential option; the invention is not limited to this specific network/protocol architecture but can be applied generally. The following assumptions on the architecture are made here:

Per bearer level decision where to serve each packet, C/U plane split
  As an example UE RRC signaling and high QoS data such as VoLTE can be served by the Macro cell, while best effort data is offloaded to the small cell.
No coupling between bearers, so no common PDCP or RLC required between the Macro cell and small cell
Looser coordination between RAN nodes
SeNB has no connection to S-GW, i.e., packets are forwarded by MeNB
Small Cell is transparent to CN.

Regarding the last two bullet points, it should be noted that it is also possible that SeNB is connected directly with the S-GW, i.e., S1-U is between S-GW and SeNB. Essentially there are three different options w.r.t the bearer mapping/splitting:

Option 1: S1-U also terminates in SeNB; depicted in FIG. 21a
Option 2: S1-U terminates in MeNB, no bearer split in RAN; depicted in FIG. 21b
Option 3: S1-U terminates in MeNB, bearer split in RAN; depicted in FIG. 21c FIGS. 21a-c depict those three options taking the downlink direction for the U-Plane data as an example. For explanation purpose, option 2 is mainly assumed for this application, and is the basis for FIG. 20 too.

User Plane Architecture for Small Cell Enhancement

In addition to the discussion on the splitting of the U-plane data as depicted in FIGS. 21a-c, different alternatives have been discussed for the user plane architecture too.

A common understanding is that, when the S1-U interface terminates at the MeNB, the protocol stack in the SeNB must at least support RLC (re-)segmentation. This is due to the fact that RLC (re-)segmentation is an operation that is tightly coupled to the physical interface (e.g., MAC layer indicating size of the RLC PDU, see above), and when a non-ideal backhaul is used, RLC (re-)segmentation must take place in the same node as the one transmitting the RLC PDUs.

Based on this assumption, four families for the user plane alternatives are distinguished in the on-going discussion.

A. Independent PDCPs: this option terminates the currently defined air-interface U-plane protocol stack completely per bearer, and is tailored to realize transmission of one EPS bearer by one node, but could also support splitting of a single EPS bearer for transmission by MeNB and SeNB with the help of an additional layer. The transmission of different bearers may still happen simultaneously from the MeNB and a SeNB.

B. Master-Slave PDCPs: this option assumes that S1-U terminates in MeNB with at least part of the PDCP layer residing in the MeNB. In case of bearer split, there is a separate and independent RLC bearer, also at UE side, per eNB configured to deliver PDCP PDUs of the PDCP bearer, terminated at the MeNB.

C. Independent RLCs: this option assumes that S1-U terminates in MeNB with the PDCP layer residing in the MeNB. In case of bearer split, there is a separate and independent RLC bearer, also at UE side, per eNB configured to deliver PDCP PDUs of the PDCP bearer, terminated at the MeNB.

D. Master-Slave RLCs: this option assumes that S1-U terminates in MeNB with the PDCP layer and part of the RLC layer residing in the MeNB. While requiring only one RLC entity in the UE for the EPS bearer, on the network side the RLC functionality is distributed between the nodes involved, with a "slave RLC" operating in the SeNB. In downlink, the slave RLC takes care of the delay-critical RLC operation needed at the SeNB: it receives from the master RLC at the MeNB readily built RLC PDUs (with Sequence Number already assigned by the master) that the master has assigned for transmission by the slave, and transmits them to the UE. The custom-fitting of these PDUs into the grants from the MAC scheduler is achieved by re-using the currently defined re-segmentation mechanism.

Based thereon different architectures are proposed, which are illustrated in FIGS. 22a-22i; these are taken from the Email Discussion Report on U-Plane Alternatives, 3GPP TSG-RAN WG2 Meeting #82, R2-131621 by Nokia Siemens Networks (Rapporteur).

An overview of the main characteristics of the various alternatives illustrated in FIGS. 22a-i is given in the following; where bearer split shall be understood as the ability to split a bearer over multiple eNBs. As can be seen from the figures two bearers are assumed which are indicated to come over the S1 interface.

1A: S1-U terminates in SeNB+independent PDCPs (no bearer split);

2A: S1-U terminates in MeNB+no bearer split in MeNB+ independent PDCP at SeNB;

2B: S1-U terminates in MeNB+no bearer split in MeNB+ master-slave PDCPs;

2C: S1-U terminates in MeNB+no bearer split in MeNB+ independent RLC at SeNB;

2D: S1-U terminates in MeNB+no bearer split in MeNB+ master-slave RLCs;

3A: S1-U terminates in MeNB+bearer split in MeNB+ independent PDCPs for split bearers;

3B: S1-U terminates in MeNB+bearer split in MeNB+ master-slave PDCPs for split bearers;

3C: S1-U terminates in MeNB+bearer split in MeNB+ independent RLCs for split bearers;

3D: S1-U terminates in MeNB+bearer split in MeNB+ master-slave RLCs for split bearers.

During the discussion various advantages and drawbacks are identified for each of the above alternatives.

Shortcomings of User Plane Architecture

As explained above, the backhaul link between the MeNB and SeNB could be slow and thus cause a one-direction latency which could be high, e.g., 60 ms (see above table for the non-ideal backhaul).

Further, in some user plane architecture alternatives even the part of the Access Stratum protocol layers (e.g., PDCP, RLC, MAC) will be distributed between the MeNB and SeNB. Correspondingly, the high latency would make it impossible to share real time information between the nodes; some information might be even outdated by the time it reaches the other node.

In addition, the inter-layer/cross-layer communication would increase the interface signaling burden on the interface between the nodes (i.e., X2 interface between Macro and Small eNB). It should also be ensured that the load on this interface is not unnecessary.

In more detail, the latency introduced due to the Dual Connectivity in inter-layer/cross-layer communication can be a source of other problems, e.g., to the existing procedure of the PDCP SDU/PDU discard mechanism.

As explained in connection with FIG. 13, in the prior art the PDCP SDU discard works based on the discardTimer, upon expiry of which the corresponding PDCP SDU along with the corresponding PDCP PDU (if already generated) are discarded. If the corresponding PDCP PDU has already been submitted to the lower layer, the discard is to be indicated to the lower layer.

The PDCP discard mechanism of FIG. 13 may be applied to the scenario where the PDCP and RLC layers are distributed between the MeNB and SeNB, and in particular where the PDCP (or at least the PDCP SDU discard mechanism) is not at the SeNB; this is illustrated in FIG. 23. This is true for at least currently discussed user plane architectures of Alternatives 2C, 2D, 3C, 3D; and possibly also for Alternatives 2B and 3B, depending on how the Master-Slave PDCP layers in MeNB and SeNB are split, in particular as to whether the PDCP SDU/PDU discard functionality as discussed is located at the MeNB or the SeNB.

As can be seen from FIG. 23, it is assumed that the PDCP layer, and in particular the PDCP discard function, is located in the MeNB, whereas the RLC layer is located at the SeNB.

For data to be transmitted in the downlink from the MeNB/SeNB to the UE, the PDCP layer starts a discardTimer for each PDCP SDU it receives, and continuously checks whether the timer for the PDCP SDU expires. In addition, the PDCP layer also performs its usual function of generating a PDCP PDU out of the PDCP SDU (e.g., Header Compression, Ciphering, Integrity Protection, add PDCP header, see FIG. 11) and forwarding the PDCP PDU to the RLC layer. Upon expiry of the discardTimer for a particular PDCP SDU, the PDCP PDU and PDCP SDU shall be discarded. Furthermore, the PDCP layer in the MeNB checks whether the correspondingly generated PDCP PDU was already forwarded to the lower layer, RLC, or not. If not, no indication towards the RLC layer is necessary. If the PDCP PDU was already forwarded to the RLC ("Yes"), although the PDCP PDU and SDU in the PDCP layer are discarded, it is further necessary to instruct the RLC to discard the corresponding PDCP PDU as well. The RLC layer at the SeNB in turn checks whether it has already proceeded to map the PDCP PDU (or a segment of it) to an RLC PDU, in which case discard of the PDCP PDU in the RLC layer is no longer possible. If however the PDCP PDU was not yet processed by the RLC layer to a RLC PDU, then the PDCP PDU may be discarded in the RLC layer too.

It should be noted that the PDCP PDU is from RLC perspective an RLC SDU; this applies for most alternatives of FIG. 22. However, where the RLC layer is split between the MeNB and SeNB (see Alternatives 2D and 3D), the terminology is somewhat ambiguous, since the RLC layer in the MeNB receives the PDCP PDU, performs particular functions on it (which are not yet defined), and then forwards the resulting "packet" to the RLC layer of the SeNB. From the perspective of the RLC layer of the SeNB, it may be said that it receives an RLC PDU or an RLC SDU, depending on whether the functions of the RLC layer in the MeNB are already considered to form the RLC PDU or not. In the following description of the invention, it is assumed for illustration purposes and for simplicity only that the RLC layer at the SeNB receives an RLC SDU from the MeNB (be it from the PDCP layer or from the Master RLC layer in the MeNB); which should however not restrict the invention and scope to this terminology, the use of the terminology "RLC PDU" may be used equivalently in this connection.

As mentioned, the MeNB indicates the discard of PDCP PDU(s) to the RLC layer at the SeNB. This may result in per-packet discard information being sent on the X2-interface. Firstly, this is a waste of resources since this information needs to be carried for each PDCP PDU that may need to be discarded.

Another problem is that due to the X2-interface latency, it is possible that in the meantime, the SeNB actually started transmitting the PDCP PDU (or at least a PDCP PDU segment) i.e., forming the RLC PDU; with the result that the SeNB must complete the PDU successful transmission—which would not be necessary otherwise. Therefore, due to the possible high latency on the X2-interface, the discard functionality may not really work for downlink transmissions.

BRIEF SUMMARY

One object of the invention is to provide an improved method for discarding downlink data in form of PDCP SDUs/PDUs in a dual connectivity scenario. A more specific object of the invention is to improve the discard function of the PDCP layer and the corresponding interrelation with the RLC layer, in cases where said PDCP discard function is located in the master base station (but not in the secondary base station), and the RLC layer is in the secondary base station.

The object is solved by the subject matter of the independent claims. Advantageous embodiments are subject to the dependent claims.

For the first aspect of the invention, it is assumed that the mobile station is in dual connectivity and thus connected to both a master base station and a secondary base station via respective communication links. The mobile station is at least receiving data packets which are forwarded from the master base station via the secondary base station to the mobile station. A protocol stack, including a higher layer (e.g., PDCP layer) with a master discard function is located at the master base station, but not at the secondary base station. The secondary base station also has a protocol stack, but rather than having said particular higher layer of the master base station, it does have a lower layer, which is the layer below the higher layer of the master base station, (e.g., RLC layer). Correspondingly, the data packets are forwarded from the higher (e.g., PDCP) layer of the master base station to the lower (e.g., RLC) layer at the secondary base station.

The master discard function of the higher layer (e.g., PDCP) at the master base station allows discarding those data packets which are (after proper processing in said higher layer) not yet successfully forwarded to the mobile station. To said end, a master timer of the master discard function is started for each data packet (e.g., PDCP SDU), upon reception of same. The higher layer processes the received data packet (e.g., PDCP SDU) properly, for example by generating a processed data packet (e.g., PDCP PDU) to be forwarded to the lower layer (e.g., RLC).

The master timer may be stopped if the data packet was successfully forwarded to the mobile station; which could e.g., be notified by the lower layer. In that case also, the received and processed data packets may be eventually deleted at the higher layer, since they are no longer necessary, thus allowing emptying the buffer at the master base station. If however the master timer expires (i.e., before the forwarding of the data packet is successfully completed), the data packet (e.g., PDCP SDU) and the processed data packet (e.g., PDCP PDU) are discarded at the higher layer (e.g., PDCP).

Furthermore, it is assumed that a secondary discard function is configured in said lower layer at the secondary base station, which to some extent mirrors the master discard function in the master base station. To said end, the master base station configures the secondary discard function based on the master discard function in the higher layer; which may include transmitting a configuration message from the master base station to the secondary base station, the configuration message at least comprising a timer value to be used in connection with the secondary timer of the secondary discard function. The timer value in the configuration message may be either the timer value of the master timer, or alternatively may be already a lower value so as to compensate for delay(s) incurred due to the communication link between the master and secondary base station and/or the processing delay for flow control spent on the whole process of transmitting the data packet from the master to the secondary base station. Still alternatively, the adapting of the secondary timer value can be also performed by the secondary base station, such that the configuration message to be used by the secondary base station includes the master timer value, which however is adjusted by the secondary base station to compensate for the various delays between the reception of the data packet in the higher layer of the master base station and the reception of the data (after processing by the higher layer) in the lower layer of the secondary base station. Thus, the master timer and the secondary timer for a particular data packet shall expire at essentially the same time.

Moreover, to facilitate the synchronization of the two timers, master and secondary timer, time stamp information may be provided from the master to the secondary base station, as follows. Every time a data packet is received in the higher layer at the master base station, the master base station may additionally generate a time stamp for said data packet, the time stamp indicating either the reception time at which the data packet was actually received in the higher layer, e.g., at which time the master timer was triggered, or indicating the expiry time of the master timer remaining for the data packet. In any case, the time stamp is provided to the secondary base station, in addition to the actual data packet (e.g., as part of the header of the data packet), and thus can be used by the secondary base station to set up the secondary timer to match the master timer for the particular data packet.

The secondary timer is started each time a data packet (e.g., PDCP PDU) is received at the lower layer from the higher layer at the master base station. Correspondingly, upon expiry of the secondary timer, the received data packet (e.g., PDCP PDU) is discarded at the lower layer of the secondary base station.

As a result, when a data packet, to be forwarded to the mobile station, is received at the master base station, and in particular at the higher layer (e.g., PDCP) of the master base station protocol stack, the master timer of the master discard function is started, and the master base station higher layer processes the data packet (e.g., to generate a PDCP PDU out of the received PDCP SDU).

First, it is assumed for illustration purposes that the processed data packet (e.g., PDCP PDU) cannot be forwarded to the lower layer at the secondary base station, before the master timer expires. Correspondingly, the processed data packet (e.g., PDCP PDU), as well as the received data packet (e.g., PDCP SDU), are discarded by the higher layer of the master base station.

When assuming that the processed data packet (e.g., PDCP PDU) is indeed forwarded to the lower layer at the secondary base station, the secondary timer of the secondary discard function at the secondary base station is started upon reception of the processed data packet (e.g., PDCP PDU; may also be termed RLC SDU) at the lower layer of the secondary base station. However, it is assumed the lower layer at the secondary base station is not able (for whatever reason) to forward the data packet further towards the mobile station.

Correspondingly, the master timer at the master base station (which is still running, since the data packet was not yet successfully transmitted to the UE) expires eventually, and thus triggers the discard of the corresponding received data packet and processed data packet (e.g., PDCP SDU and PDU) at the higher layer of the master base station. Likewise, the secondary timer of the secondary discard function at the secondary base station will expire for this data packet too, and thus triggers the discard of the corresponding data packet at the lower layer of the secondary base station.

It should be noted that advantageously, upon expiry of the secondary timer at the secondary base station, the secondary base station checks whether the data packet (or at least part of it) was already processed by the lower layer as far so as to generate a further data packet specific to the lower layer, ready to be transmitted from the lower layer at the secondary base station towards the mobile station; in the more specific embodiment pertaining to the PDCP and RLC layer, the secondary base station checks whether the PDCP PDU (or a segment of same) was already mapped to a RLC PDU. In the positive case (i.e., lower layer data packet generated; RLC PDU generated), the discard of the data packet at the lower layer is not performed. In the negative case, the discard of the data packet at the lower layer is performed.

A second alternative aspect of the invention also solves the above-mentioned underlying problem(s) of the invention, however avoids having a secondary discard function at the secondary base station so as to simplify the design of the secondary base station. A similar scenario is assumed as for the first aspect, thus assuming a mobile station which is connected to both a master and secondary base station via respective communication links. The mobile station at least receives data packets which are forwarded from the master base station via the secondary base station to the mobile station. A protocol stack, including a higher layer (e.g., PDCP layer) with a master discard function is located at the master base station, but not at the secondary base station.

The secondary base station also has a protocol stack, but rather than having said particular higher layer of the master base station, it does have a lower layer, which is the layer below the higher layer of the master base station (e.g., RLC layer). Correspondingly, data packets are forwarded from the higher (e.g., PDCP) layer of the master base station to the lower (e.g., RLC) layer at the secondary base station, before being further forwarded to the mobile station.

As with the first aspect of the invention, the master discard function of the higher layer (e.g., PDCP) at the master base station allows to discard those data packets which are not yet successfully forwarded to the mobile station. A corresponding master timer of the master discard function is started for each data packet (e.g., PDCP SDU) received by the higher layer. The higher layer (e.g., PDCP) processes the received data packet (e.g., PDCP SDU) properly, for example by generating a processed data packet (e.g., PDCP PDU) to be forwarded to the lower layer (e.g., RLC).

Upon expiry of the master timer, the data packet and the processed data packet (e.g., PDCP SDU and PDU respectively) are discarded by the higher layer.

In contrast to the discard function as explained in the prior art section, no check is performed as to whether the data packet was already forwarded to the lower layer or not. Irrespectively, the master base station, and in particular its higher layer (e.g., PDCP), does not inform the lower layer (e.g., RLC) about the discard of the particular data packet.

In contrast to the first aspect of the invention, also no secondary discard function is implemented in the secondary base station matching the described master discard function in the master base station. Instead, the lower layer (e.g., RLC) of the secondary base station does not learn about the discard of the data packet in the master base station, but continues to perform the lower layer processing for the received data packet (e.g., transmission of data packet to the mobile station).

The lower layer (e.g., RLC) at the secondary station keeps on transmitting the data packet (e.g., PDCP PDU; as one or more RLC PDUs) to the mobile station, and upon successful delivery of the data packet (e.g., PDCP PDU) to the mobile station, the lower layer (e.g., RLC) at the secondary station can discard the data packet (e.g., PDCP PDU) received from the higher layer at the master base station. Accordingly, the second aspect provides a discarding scheme that involves less processing at the master and secondary base station, as well as a simplified secondary base station.

According to a third aspect of the invention, the value of the master timer of the master discard function is taken into account when the mobile station decides to use the bearer to the master or secondary base station to transmit data. In more detail, a scenario is assumed where the mobile station is connected to both the master and secondary base station via respective communication links. In dual connectivity it is possible that the same bearers are served by both the master and secondary base station (see FIG. 21c EPS bearer #2); i.e., some packets of the particular bearer #2 are transmitted via the master base station and others are transmitted via the secondary base station. This may depend on the radio conditions or other criteria.

This third aspect of the invention can be used alternatively or additionally to the above-described first and second aspects of the invention. It is suggested that the remaining time of the master timer of the master discard function is taken into account by the mobile station when deciding whether to transmit a data packet via the master or secondary base station, especially for packet that have already suffered a long delay or have a short discard timer.

A first embodiment of the invention provides a method for discarding data packets destined for a mobile station connected to both a master base station and a secondary base station. The data packets are forwarded from the master base station via the secondary base station to the mobile station. A higher layer with a master discard function is located at the master base station but not at the secondary base station. The master discard function discards data packets upon expiry of a master timer started upon reception of each data packet. The master base station configures a secondary discard function in a lower layer of the secondary base station, based on the master discard function in the higher layer of the master base station. The master base station forwards the data packet from the higher layer to the lower layer of the secondary base station. The secondary discard function of the lower layer at the secondary base station discards the received data packet upon expiry of the secondary timer started by the lower layer upon reception of the data packet from the higher layer at the master base station.

A second embodiment of the invention provides a method for discarding data in form of a PDCP PDU destined for a mobile station connected to both a master base station and a secondary base station. The data is forwarded from the master base station via the secondary base station to the mobile station. A PDCP layer with a master discard function is located at the master base station but not at the secondary base station. A PDCP SDU is received at the PDCP layer at the master base station. Upon reception of the PDCP SDU, the PDCP layer at the master base station starts the master timer of the master discard function of the PDCP layer for the received PDCP SDU. The PDCP layer at the master base station generates the PDCP PDU out of the received PDCP SDU. The generated PDCP PDU is forwarded by the PDCP layer at the master base station to the RLC layer at the secondary base station. Upon forwarding the generated PDCP PDU by the master base station to the RLC layer at the secondary base station, the PDCP layer at the master base station discards the received PDCP SDU and the generated PDCP PDU. Upon expiry of the master timer of the master discard function of the PDCP layer at the master base station for the received PDCP SDU, the PDCP layer determines whether the PDCP PDU, generated out of the PDCP SDU, was already forwarded by the PDCP layer at the master base station to the RLC layer at the secondary base station. In the positive case, the PDCP layer does not instruct the RLC layer to discard the PDCP PDU, forwarded to the RLC layer.

A third embodiment of the invention provides a mobile station for transmitting data to a base station, the mobile station being connected to both a master base station and a secondary base station. A higher layer with a master discard function is located at the master base station but not at the secondary base station. The master discard function discarding data packets upon expiry of a master timer started upon reception of each data packet. A receiver of the mobile station receives a message from the master base station including information on the delay time of the communication link between the master base station and the secondary base station; or, a processor of the mobile station estimates the delay time of the communication link between the master base station and the secondary base station, based on the different reception times of subsequent PDCP PDUs received from the master base station and secondary base station. A processor of the mobile station determines whether a remaining expiry time of a discard timer in the PDCP layer of the mobile station for a PDCP SDU to be transmitted to the secondary base station is equal to or less than the delay time of the communication link between the master base station and the secondary base station. In the positive case, the processor discards the PDCP SDU and the PDCP PDU, generated from the PDCP SDU, or a transmitter of the mobile station transmits the PDCP PDU directly to the master base station via a communication link between the mobile station and the master base station. The first embodiment of the invention provides a master base station for forwarding data packets destined for a mobile station. A mobile station is connected to both the master base station and a secondary base station. The data packets are forwarded from the master base station via the secondary base station to the mobile station. A higher layer with a master discard function is located at the master base station but not at the secondary base station, the master discard function discarding data packets upon expiry of a master timer started upon reception of each data packet. A processor and transmitter of the master base station configure a secondary discard function in a lower layer of the secondary base station, based on the master discard function in the higher layer of the master base station, such that the secondary discard function of the lower layer at the secondary base station discards a received data packet upon expiry of the secondary timer started by the lower layer upon reception of the received data packet from the higher layer at the master base station. The transmitter forwards the data packet from the higher layer to the lower layer of the secondary base station.

The first embodiment of the invention provides a secondary base station for forwarding data packets to a mobile station, wherein a mobile station is connected to both a master base station and the secondary base station. The data packets are forwarded from the master base station via the secondary base station to the mobile station. A higher layer with a master discard function is located at the master base station but not at the secondary base station, the master discard function discarding data packets upon expiry of a master timer started upon reception of each data packet. A processor of the secondary base station configures a secondary discard function in a lower layer of the secondary base station, based on the master discard function in the higher layer of the master base station. A receiver of the secondary base station receives at the lower layer of the secondary base station the data packet from the higher layer of master base station. A processor of the secondary base station discards by the secondary discard function of the lower layer at the secondary base station the received data packet upon expiry of the secondary timer started by the lower layer upon reception of the data packet from the higher layer at the master base station.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE SEVERAL VIEWS OF THE DRAWINGS

In the following exemplary embodiments are described in more detail with reference to the attached figures and drawings.

FIGS. 22*a-i* illustrate the different user plane architecture alternatives currently discussed in connection with dual connectivity in the MeNB and SeNB.

DETAILED DESCRIPTION

Figure 1:
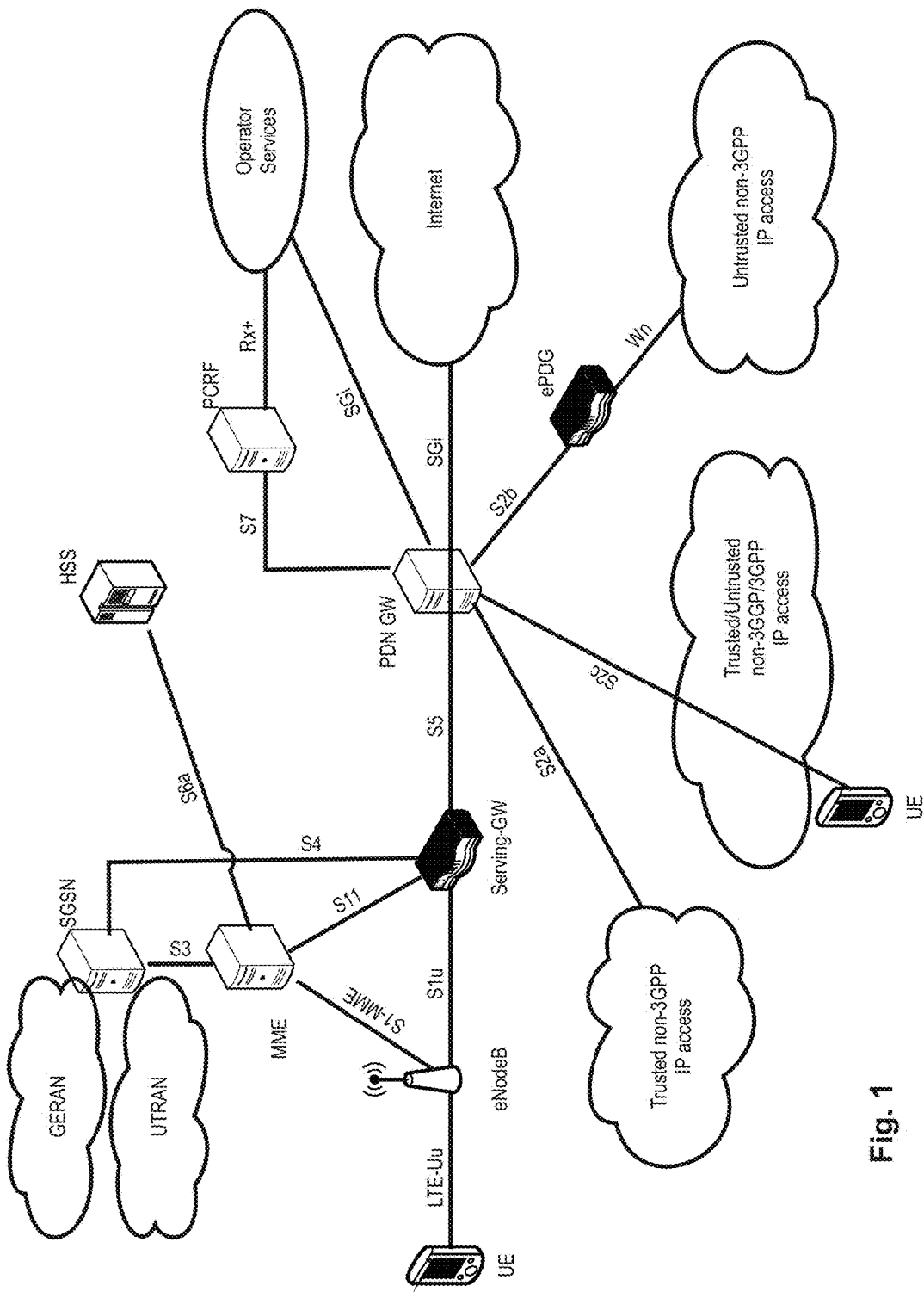
FIG. 1 shows an exemplary architecture of a 3GPP LTE system.
Figure 2:
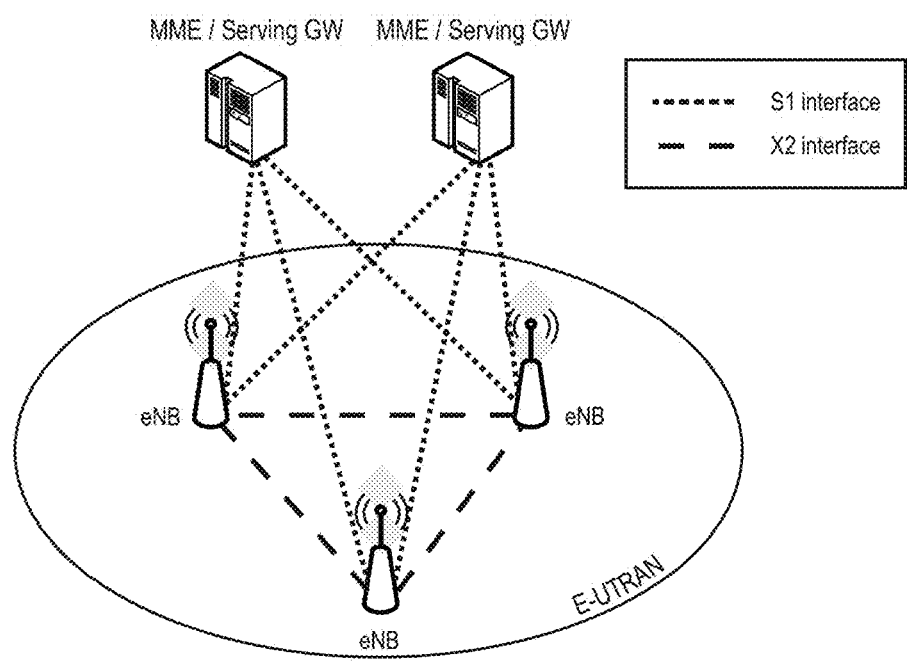
FIG. 2 shows an exemplary overview of the overall E-UTRAN architecture of 3GPP LTE.

The following paragraphs will describe various exemplary embodiments. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the embodiments may be advantageously used for example in a mobile communication system such as 3GPP LTE-A (Release 10/11/12) communication systems as described in the Technical Background section above, but the embodiments are not limited to its use in this particular exemplary communication networks.

A mobile station or mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "master base station" used in the claims may be also called macro base station, or master/macro eNB in accordance with Dual Connectivity of 3GPP.

The term "secondary base station" used in the claims may be also called slave base station, or secondary/slave eNB in accordance with Dual Connectivity of 3GPP.

The term "discard" is used in the claims and in the description in connection with the discardTimer and the discarding of e.g., PDCP SDU/PDUs that shall be discarded upon expiry of the timer. However, "discard" shall not restricted specifically to only deleting, but should rather be more generally understood as the process of setting a PDCP PDU/SDU as not being necessary anymore and thus as set to be deleted. When the actual deletion takes place may be implementation-based, e.g., may be done per-packet and thus basically immediately upon indicating a PDCP SDU/PDU as discarded or may be periodical in a way that every e.g., 100 ms the buffer is cleared of discarded data (PDUs/SDUs).

In the following, several exemplary embodiments will be explained in detail. These are supposed to be implemented in the wide specification as given by the 3GPP standards, with the particular key features as explained in the following pertaining to the various embodiments.

The explanations should not be understood as limiting, but as a mere example of the embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the invention as such.

First Embodiment

In the following a first set of embodiments will be explained. To simplify the illustration of the principles of the first embodiment, several assumptions are made; however, it should be noted that these assumptions should not be interpreted as limiting the scope of the present application, as broadly defined by the claims.

Figures 21A, 21B, 21C:
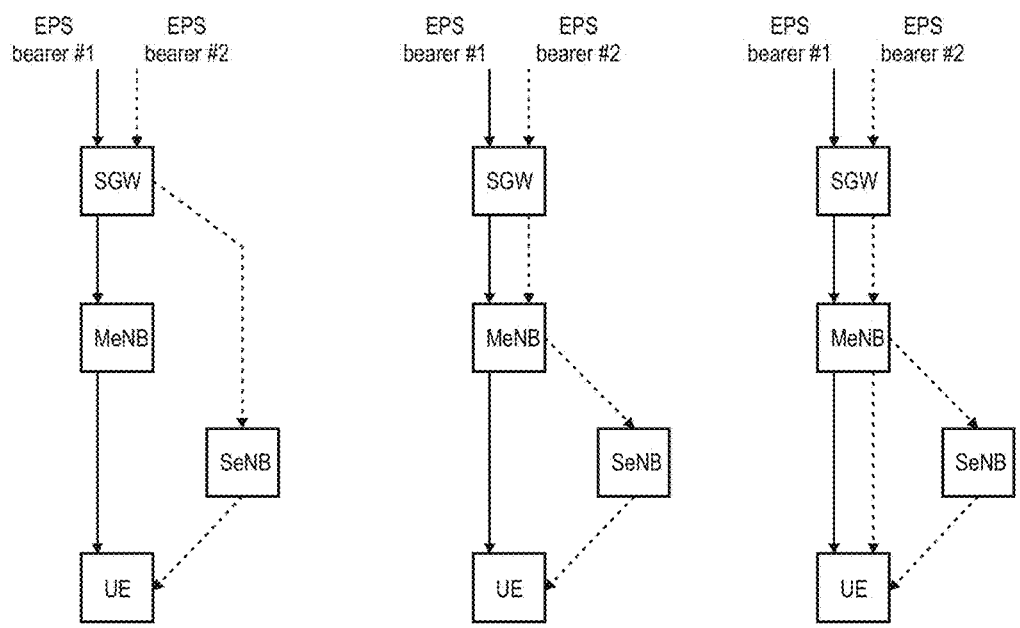
FIGS. 21*a-c* illustrate the different options for having two separate EPS bearers between the SGW and the UE.
Figure 24:
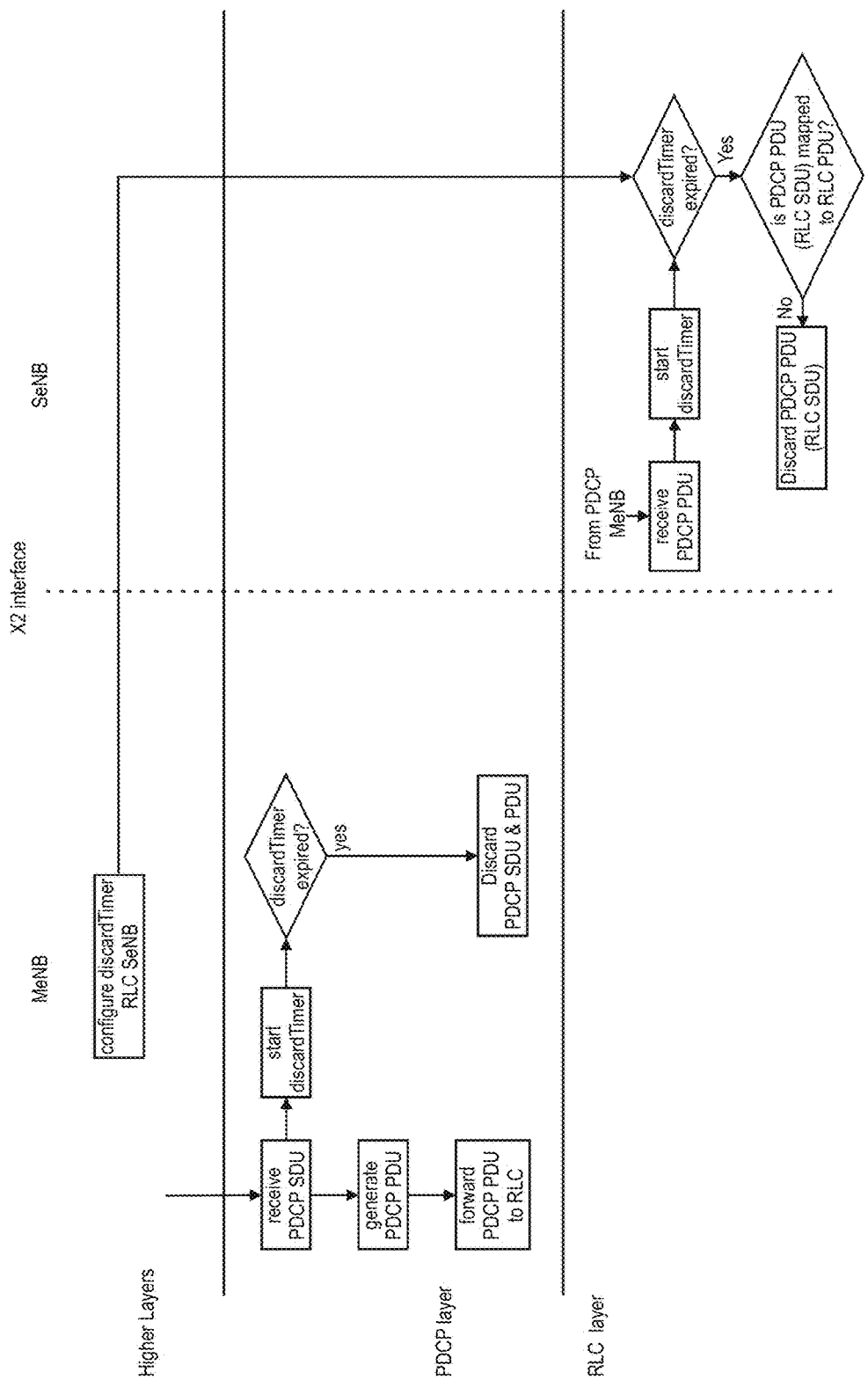
FIG. 24 is a flow diagram for illustrating the improved discard function according to a first exemplary embodiment.

The first embodiment will be described with reference to FIG. 24, which is a flow diagram illustrating various steps as performed for a particular first embodiment. A dual connectivity scenario in a small cell environment is assumed, where the UE is connected to both the MeNB and the SeNB, and at least receives data that is forwarded from the SGW to the MeNB, and finally via the SeNB to the UE, i.e., illustrated exemplary in FIGS. 21b, 21c as EPS bearer #2. As indicated, EPS bearer #2 can either be split in the MeNB such that the bearer can be transmitted via both eNBs as needed (FIG. 21c) or is not split in the MeNB but separately forwarded from EPS bearer #1 (FIG. 21b).

According to the small cell discussion in 3GPP, different user plane architectures have been under discussion as explained in the background section with reference to FIG. 22. For the first embodiment it is assumed that the user plane architecture of MeNB and SeNB is such that the PDCP layer with the discard function is located at the MeNB but not at the SeNB; furthermore, the lower RLC layer shall be located at the SeNB and may or may not be located at the MeNB. Correspondingly, the present first embodiment may refer to any of the discussed user plane architectures of FIGS. 22c, 22d, 22e, 22g, 22h, 22i. In the user plane architectures of FIGS. 22c (Alternative 2B) and 22g (Alternative 3B), where the PDCP layer is split between the MeNB and SeNB, it is not clear which functions are actually located in the MeNB and which in the SeNB; what is relevant to the first embodiment is that the discard functionality of the PDCP is located at the MeNB and thus away from the RLC layer discard functionality, making it necessary in the prior art to have inter-layer communication which goes between the MeNB and the SeNB (see description of the short comings as explained at the end of the Background Section).

Figure 10:
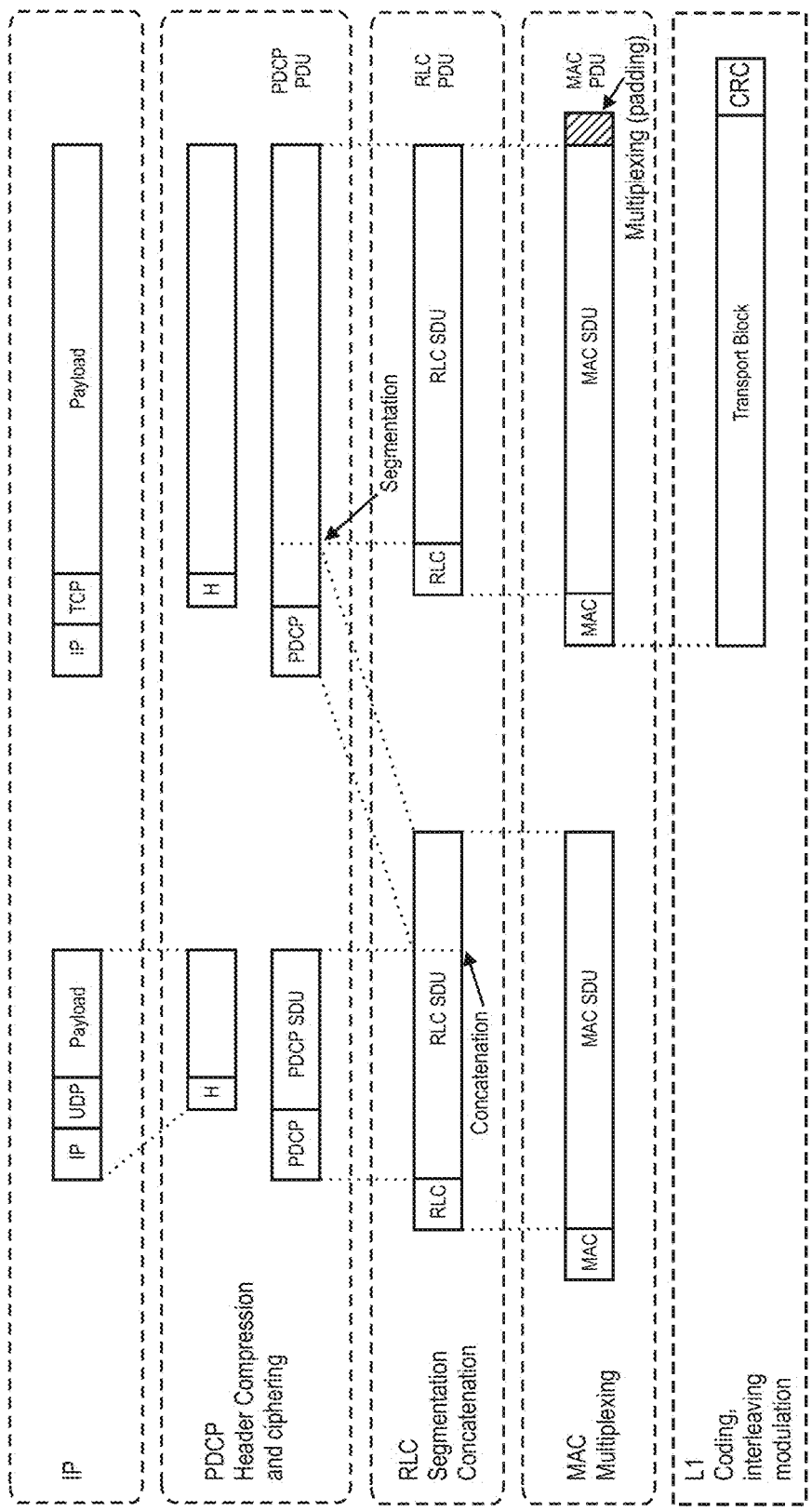
Figure 11:
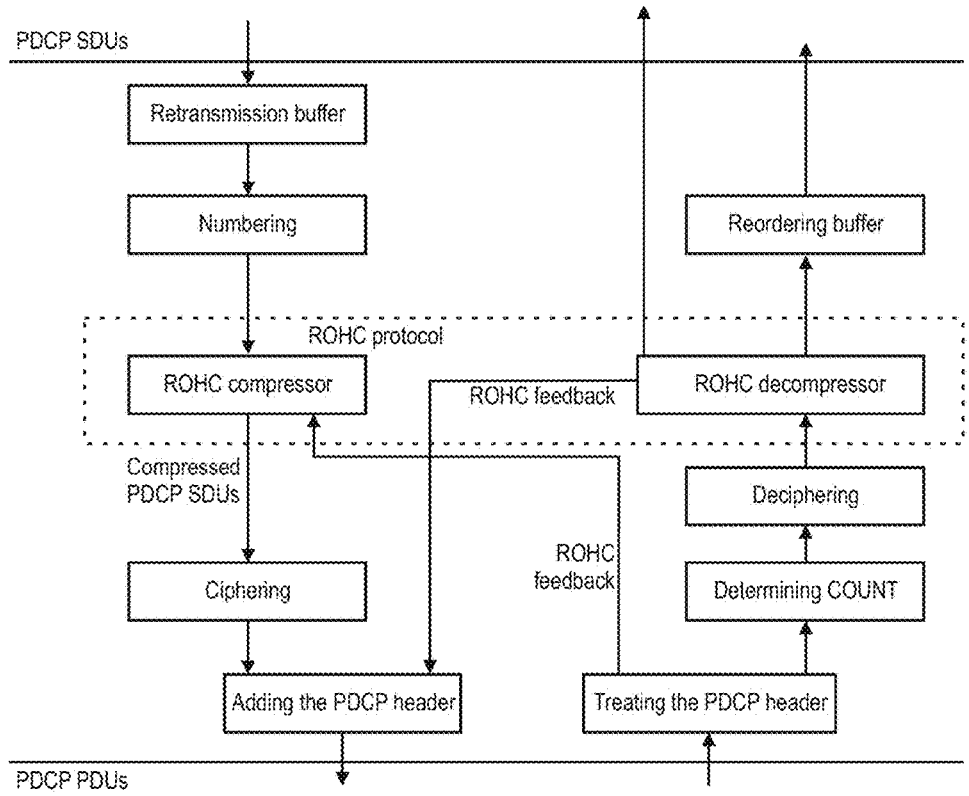
FIG. 11 illustrates the architecture of the PDCP layer for the user plane data.
Figure 12:
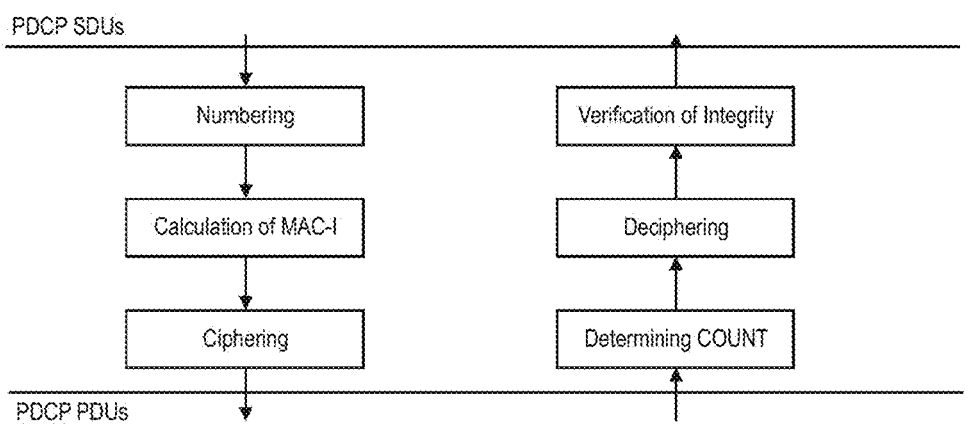
FIG. 12 illustrates the architecture of the PDCP layer for the control plane data.
Figure 13:
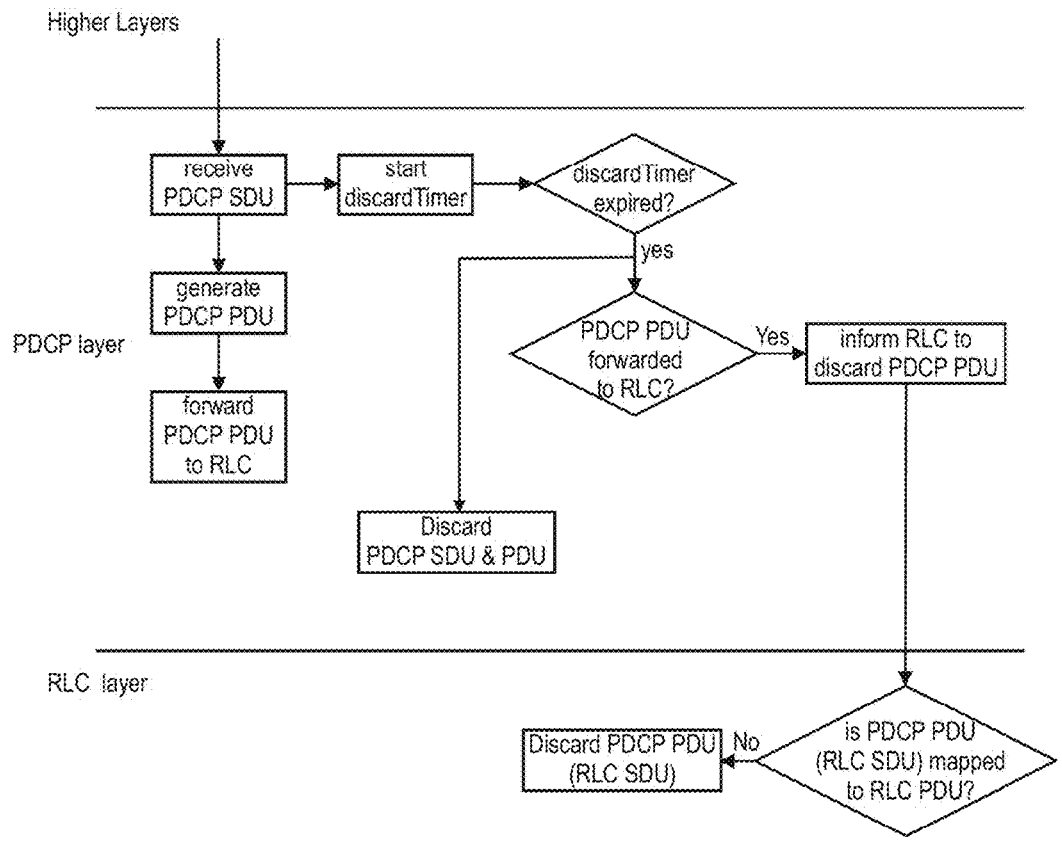
FIG. 13 is a flow diagram for illustrating in a simplified fashion the relevant steps related to the discard function in the PDCP layer and the interrelation with the discarding in the RLC layer.
Figure 14:
FIGS. 14 and 15 illustrate a Data and Control PDU respectively.
Figure 15:
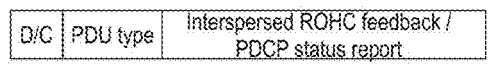
Figure 16:
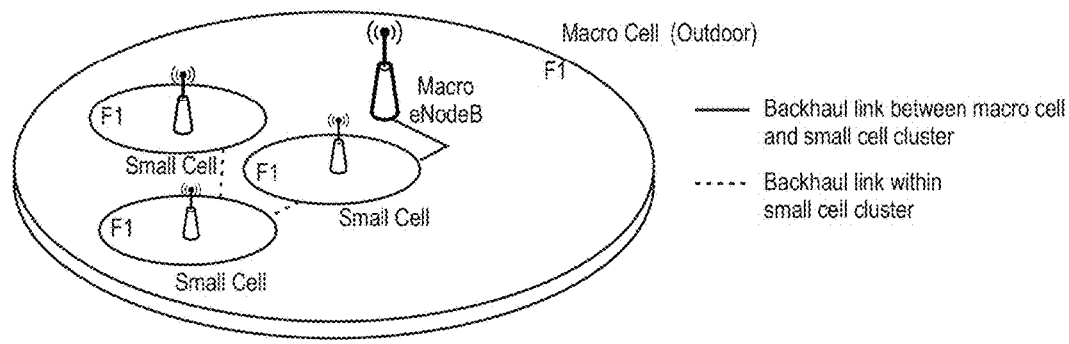
FIG. 16 illustrates a deployment scenario for small cell enhancement, where macro and small cells are on the same carrier frequency.
Figure 17:
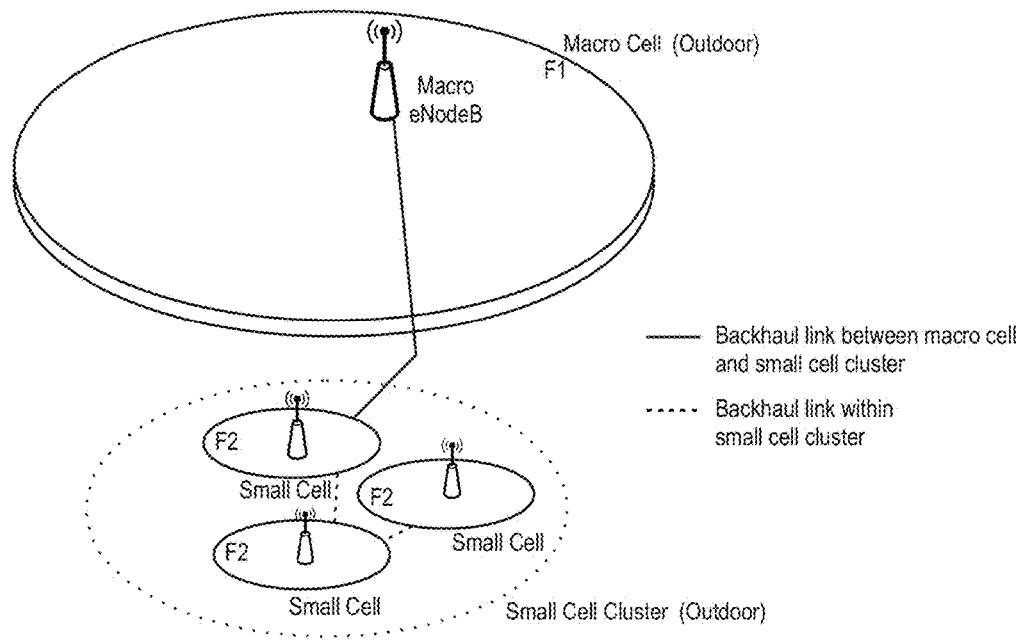
FIGS. 17 and 18 illustrate further deployment scenarios for small cell enhancement where macro and small cells are on different carrier frequencies, the small cell being respectively outdoor and indoor.
Figure 18:
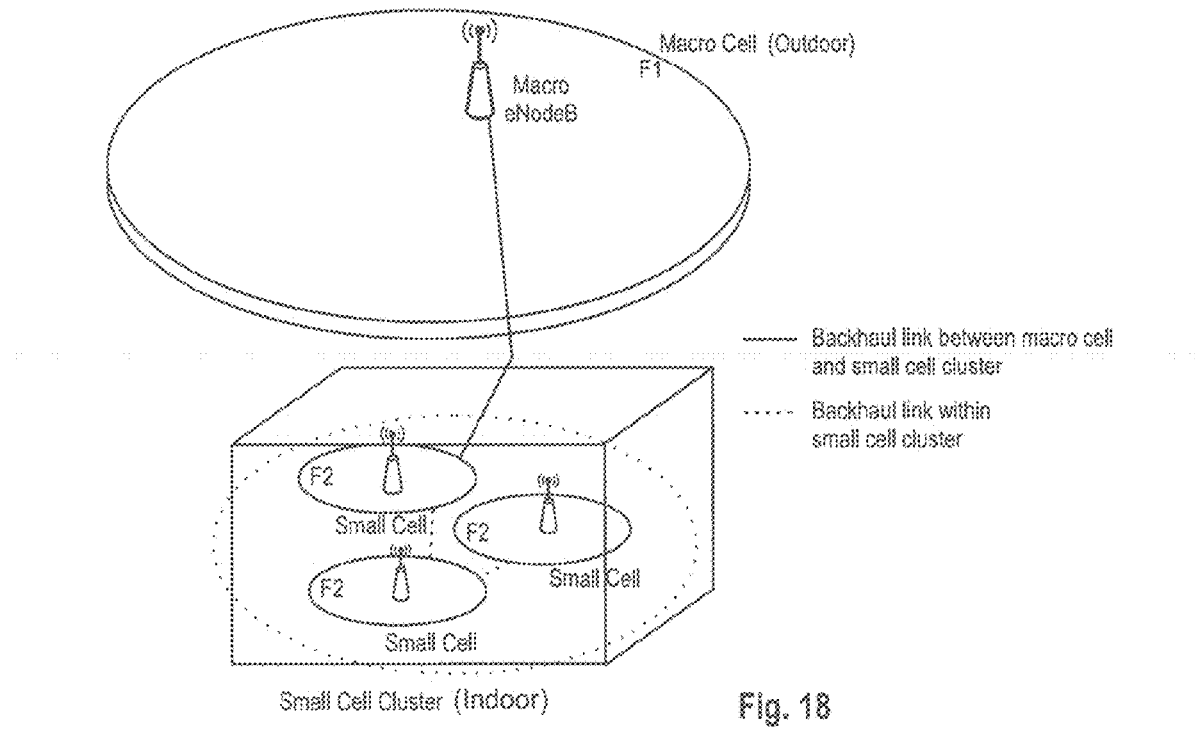
Figure 19:
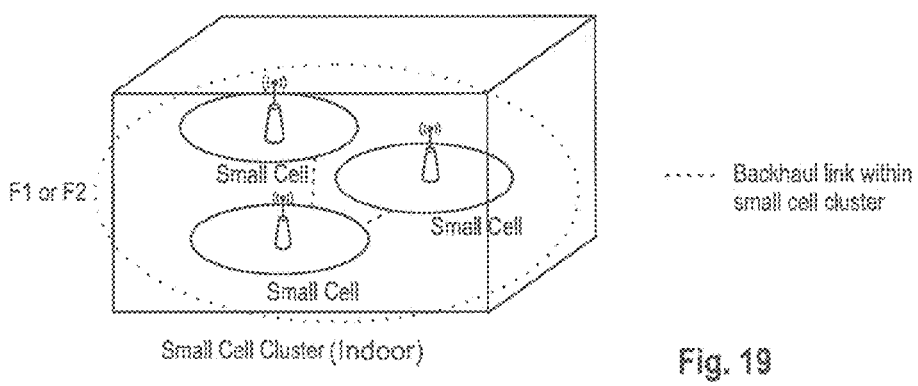
FIG. 19 illustrates a further deployment scenario for small cell enhancement with only small cells, FIG. 20 gives an overview of the communication system architecture for dual connectivity with macro and small eNBs connected to the core network, where the S1-U interface terminates in the Macro eNB and no bearer splitting is done in RAN.
Figure 20:
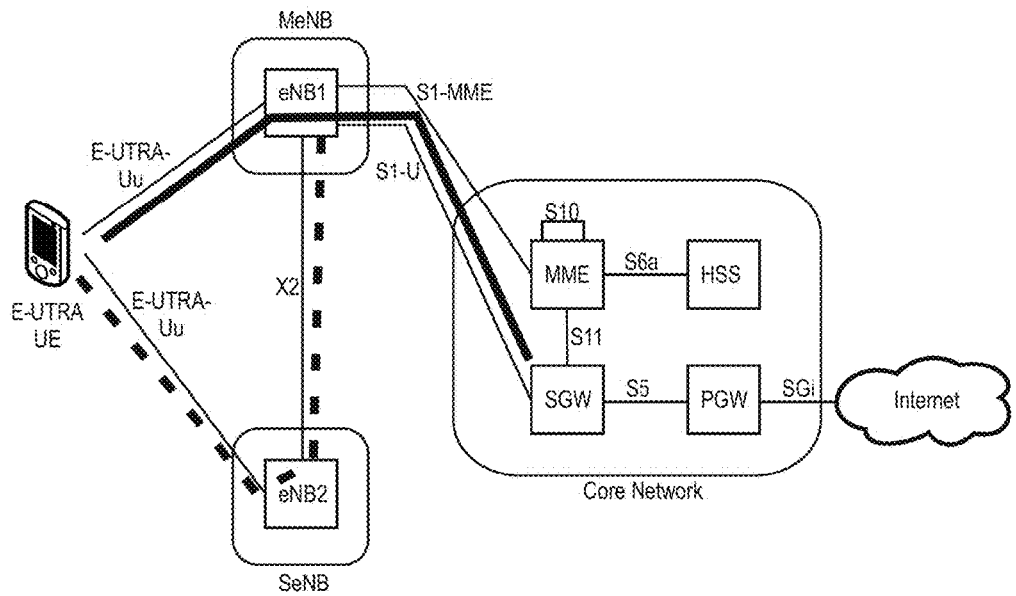

The PDCP and RLC functionality, which in the first embodiment is respectively located at the MeNB and SeNB, shall remain mostly the same as explained in the background section (e.g., with reference to FIGS. 10, 11, 12) and as defined by current 3GPP standards; except for the following changes which relate to the first embodiment. The first embodiment suggests an improved discard functionality mechanism between the PDCP and RLC layer, and thus between the MeNB and SeNB in the above-mentioned scenarios.

The discard functionality in the PDCP layer of the MeNB is configured by higher layers of the MeNB, such as RRC. Thus, the discardTimer value at the MeNB is configured and set by higher layers. It should be noted that the higher layers that configure the discard functionality at the MeNB are not present at the SeNB. According to the first embodiment, the higher layer(s), such as RRC, of the MeNB shall configure the discard functionality of the SeNB over the X2 interface, so as to basically have an additional discard functionality in the RLC layer at the SeNB in accordance with the PDCP discard functionality of the MeNB.

In general, the discard timer value used by the discard function at the SeNB may either be identical to the discard timer value used by the discard function at the MeNB. Or, the discard timer value used by the discard function at the SeNB is based on the discard timer value used by the discard function at the MeNB, but adjusted to compensate for the various delays incurred by the data from the time it reaches the PDCP layer at the MeNB in form of a PDCP SDU to trigger the PDCP discard timer until the time the data reaches the RLC layer at the SeNB in form of a PDCP PDU (also termed RLC SDU, and exceptionally RLC PDU in other cases such as those with a split RLC as in FIGS. 22e, 22i) to trigger the RLC discard timer of the first embodiment.

A corresponding configuration message shall be transmitted from the MeNB to the SeNB which allows the RLC layer of the SeNB to configure a corresponding discard timer for its discard functionality. The configuration message may include a value to be used by the SeNB for setting the discard timer of the RLC layer at the SeNB. The value may be either the same value as used for the discard timer of the PDCP discard function in the MeNB, or may be adjusted to also factor in the various delays of the data.

In more detail, this overall delay can be regarded as being composed of the backhaul delay which is inherent to the communication technology used for the backhaul link between the MeNB and SeNB (such as up to 60 ms for DSL Access) and the flow control delay incurred for the processing of data in the MeNB on the X2 interface until it is actually transmitted over the backhaul to the SeNB. This flow control can be e.g., when the MeNB cannot transmit packets on the X2 interface to the SeNB because the X2 interface was congested (too many UEs, traffic etc.) and/or SeNB had some capacity problems, e.g., processing delay, buffer capacity or even radio congestion etc. The backhaul link delay can be determined at the MeNB as well as at the SeNB since it is somewhat stable inherently due to the nature of the physical link between the MeNB and the SeNB and a given throughput on the backhaul. On the other hand the delay incurred by the flow control of data may vary considerably, thus making it difficult to provide an accurate time for the flow control delay. Nevertheless, it is still possible for the MeNB and/or the SeNB to determine an average or minimum flow control delay which can be considered when determining the timer value to be transmitted in the configuration message to the SeNB for configuring the discard timer at the SeNB.

Consequently, the discarding function at the MeNB and the discard function at the SeNB suffer from the delays incurred, thus resulting in an inefficient discard mechanism. This may be avoided by setting the timer for the discard function at the SeNB such that the delays are compensated. For instance, assuming that the discard timer at the MeNB is set to 200 ms, and the backhaul delay is 50 ms, a more accurate and thus advantageous timer value for the discard timer (may be termed effective-discardTimer) at the SeNB would be 150 ms (it is assumed for this example that the flow control delay is disregarded). Either the value in the configuration message is already set by the MeNB to 150 ms, or the value in the configuration message is set to 200 ms (the timer value of the discard timer at the MeNB) and the SeNB itself adjusts the timer value such that it configures its own discard timer to be set to 150 ms.

Similarly, the effective-discardTimer at the SeNB can additionally (or alternatively)—with respect to the adjustment because of the backhaul link delay—be adjusted to compensate for the flow control delay. When assuming that the flow control delay is a minimum or average of 20 ms, then the effective-discardTimer at the SeNB may be set to 200 ms-50 ms-20 ms (or 200 ms-20 ms, if only compensating for the flow control delay). Either the value in the configuration message is already adjusted or the configuration message includes the not-adjusted timer value for the discard timer at the MeNB and the SeNB itself adjusts the received timer value to factor in the flow control delay and/or the backhaul link delay. The SeNB may know the amount of flow control delay through the X2 link (congestion duration on X2) or may determine the flow control delay itself e.g., for the duration that it stops receiving packets through/from X2 due to its own capacity problems, e.g., processing delay, buffer capacity or even radio congestion etc.

Correspondingly, the discard function in the RLC layer at the SeNB is set up such that the associated discard timer is started upon reception of a PDCP PDU from the PDCP layer of the MeNB and expires after a time as configured by the MeNB/SeNB according to one of the above ways.

The exact implementation of how the higher layers at the MeNB configure the discard function of the RLC layer in the SenB could vary. For instance, the transmission of the configuration message can be achieved by proprietary means e.g., using O&M (operation and maintenance) or could be specified on the X2 interface using an RRC-like configuration message on the X2 interface that configures the RLC layer in the SeNB. With this configuration the SeNB is informed of the applicable discard timer for each of the bearer that it supports towards the mobile station. This configuration can be provided by the RRC layer on the MeNB to the SeNB via the X2 link or it can be configured by a higher layer to an RRC entity sitting in the SeNB via X2 or using a proprietary interface and through e.g., O&M.

After setting up both discard functionalities at the MeNB and the SeNB, the packet forwarding will be explained in the following in connection with FIG. 24. It is assumed that data is transmitted in the downlink via the MeNB, SeNB to the UE, and for exemplary purposes that the user plane architecture of FIG. 22d or FIG. 22h (Alternative 2C or 3C) is used.

When a PDCP SDU is received at the PDCP layer from higher layers, the corresponding PDCP discardTimer is started for the PDCP SDU, and a PDCP PDU is generated from the PDCP SDU according to usual mechanisms in the PDCP. The thus-generated PDCP PDU is then forwarded to the RLC layer at the SeNB via the X2 interface. It should be also noted however that the PDCP layer at the MeNB might not be able to actually forward the PDCP PDU to the RLC layer at the SeNB in a timely manner before the discard timer in the MeNB expires; this may be because of the processing delay in the MeNB, congestion on X2 link etc. . . .

Upon reception of the PDCP PDU at the RLC layer of the SeNB (from the RLC perspective an RLC SDU), the corresponding discardTimer (or effective discardTimer) in the RLC layer is started for the received PDCP PDU. Furthermore, the RLC layer of the SeNB processes the RLC SDU in the usual manner to generate one or more RLC PDUs, which can then be sent to the lower layer, i.e., the MAC layer, for further transport to the UE (not illustrated in FIG. 24) for simplicity.

Correspondingly, the discard timer at the MeNB and the discard timer at the SeNB are running for the data in the PDCP SDU.

First, it is assumed that the PDCP SDU data is successfully transmitted by the SeNB to the UE. In this case, the RLC layer in the SeNB is informed by the lower layers in the SeNB (e.g., MAC) that the corresponding RLC PDU(s) carrying the PDCP PDU data have been correctly received and acknowledged by the UE. Correspondingly, the discardTimer in the RLC layer can be stopped/aborted and the PDCP PDU data (i.e., RLC SDU) can be discarded by the RLC layer in the SeNB. Furthermore, the RLC layer of the SeNB informs the PDCP layer at the MeNB about the successful transmission of the PDCP PDU to the UE (by transmitting e.g., a Successful Delivery Indication, see below). In turn, the PDCP layer can stop/abort its own discard timer for said successfully-transmitted PDCP PDU (more accurately PDCP SDU) and then may also eventually discard the PDCP SDU and PDCP PDU. As a consequence, the MeNB will have the discardTimer running for fewer (remaining) PDCP SDUs for which it was not informed about corresponding PDCP PDUs having been successfully transmitted by the SeNB to the UE. The expiry of such discardTimer may still be indicated by the MeNB to the SeNB; since there are now fewer discardTimers running, the corresponding Discard Indication from the MeNB to the SeNB is therefore only sent for PDCP PDUs which are not yet successfully delivered to the UE, i.e., for the PDCP PDUs for which the UE has not yet transmitted a Successful Delivery Indication such that the signaling on the X2 interface will be still relieved. This avoids unnecessary X2 signaling of per PDCP PDU discard by not requiring to indicate discard per PDU but only for PDCP PDUs that were actually not delivered by the SeNB to the UE.

On the other hand, it is now assumed that the RLC layer at the SeNB could not transmit the received PDCP PDU data to the UE for any reason. In this case, the two timers at the MeNB and SeNB will eventually expire. In the MeNB, when the discard timer started for the PDCP SDU expires, the PDCP layer discards both the PDCP SDU (associated with the expired discard timer) and the PDCP PDU generated out of said PDCP SDU. Likewise, in the RLC layer at the SeNB, when the discard timer started upon reception of the PDCP PDU (i.e., RLC SDU) expires, the received PDCP PDU is to be discarded.

Moreover, in an advantageous implementation of the first embodiment, the RLC layer may, before actually discarding the PDCP PDU, check whether the data of the PDCP PDU (or any segment thereof) was already mapped to at least one RLC PDU, for transmission to the UE. In order to not disturb the RLC transmission mechanism of the RLC layer for the PDCP PDU, a discard of the PDCP PDU in the RLC layer is only performed when the PDCP PDU was not yet mapped to a RLC PDU (see "No" branch in FIG. 24).

Figure 23:
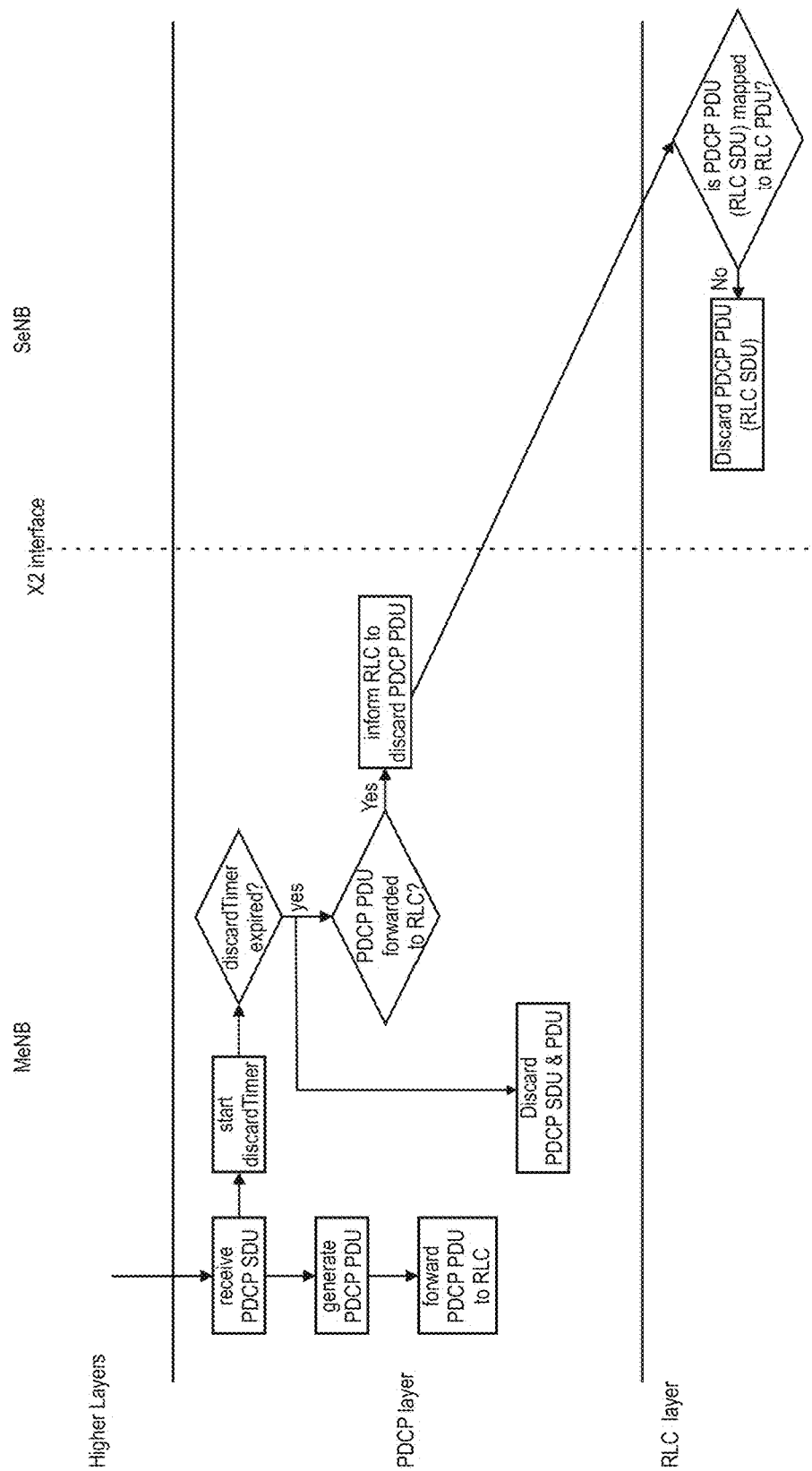
FIG. 23 is a flow diagram for illustrating in a simplified fashion the relevant steps related to the discard function in the PDCP layer and the interrelation with the discarding in the RLC layer, as in FIG. 13, when applied to user plane architectures where the PDCP discard function is located at the MeNB while the RLC layer is in the SeNB.

As apparent from the above explanation and when comparing same with the processing as explained in connection with FIG. 23, one advantage is that upon expiry of the PDCP discard timer at the MeNB, it is no longer necessary to indicate the PDCP PDU/SDU discard to the RLC layer (at the SeNB), thereby relieving the signaling on X2 and also ensuring that the discard mechanism actually works even when the backhaul delay on X2 might be longer/comparable with the discard timer value, since the RLC layer at the SeNB operates a separate timer in basic synchronization with the discard timer at the MeNB PDCP layer to allow discarding of the PDCP PDU.

Also, there is no need any more to check whether the PDCP PDU was already forwarded to the RLC layer or not, which thus simplifies the PDCP protocol in the MeNB.

Further details and improvements to the first embodiment are explained in the following.

As has been explained before, the RLC layer of the SeNB may inform the PDCP layer at the MeNB about the successful transmission of the PDCP PDU to the UE. A corresponding indication (called in the following Successful Delivery Indication) informing the MeNB can be implemented in many ways. In general, the SeNB may be configured by the MeNB how and when to transmit such a Successful Delivery Indication, i.e., when to start and stop reporting. For instance, the MeNB can ask the SeNB (on X2) to start reporting the Successful Delivery Indication for a particular bearer, and can ask the SeNB (on X2) to stop reporting for particular bearer(s).

For instance, the Successful Delivery Indication could be transmitted continuously from the SeNB to the MeNB, for each PDCP PDU that is received in the SeNB on X2 and is subsequently successfully transmitted to the UE. This has the advantage that the MeNB will be informed as soon as possible and the MeNB will unambiguously learn about which PDCP PDUs were received by the UE and which not. However, this has the drawback of a significant signaling burden on the X2 interface. Furthermore, in this case if PDCP PDU N−1 and N+1 were successfully delivered to the UE, this is correspondingly reported as such to the MeNB; but, when it is assumed that PDCP PDU N was not yet successfully delivered to the UE, and it is still in RLC re-transmission, the MeNB cannot conclude the status of PDU N (really discarded in SeNB or might still be successfully delivered to the UE. Of course, this might not be significant problem since the MeNB can hold the PDCP PDU N until it either receives the Successful Delivery Indication for PDU N too, or until the Master Discard Timer for PDU N expires. Still, an alternative would be to inform the MeNB about each PDCP PDU received over the X2 interface and having same successfully delivered to the UE in sequence.

Alternatively, the highest Sequence Number among a plurality of those successfully delivered PDCP PDUs can be transmitted to the MeNB so as to mitigate the signaling burden on the X2 interface. However, this can be misleading as will be explained in the following.

It is assumed that out of a sequence of 10 PDCP PDUs with sequence numbers 11 to 20, PDUs with sequence numbers 13 and 15 are lost when being transmitted from the MeNB to the SeNB, and PDUs with sequence numbers 17 and 19 are not successfully transmitted from the SeNB to the UE. In case the Successful Delivery Indication indicates only the last successfully transmitted PDCP PDU with sequence number 20, the MeNB would assume that all SN up to 20 have been successfully delivered and thus discards them; an opportunity for re-transmission is thus lost. Such a Successful Delivery Indication will not indicate which PDCP PDUs were dropped on X2 (PDUs with SN 13 and 15, in the above example), and will give an incorrect picture of PDCP PDUs with a sequence number less than the highest successfully delivered sequence number that were not yet successfully received in the UE (PDUs with SN 17 and 19 in the above example).

However, this drawback may not be too significant since the number of not successfully delivered PDCP PDUs should be minimal anyway, and therefore their re-transmission may be taken care by further higher layers (e.g., TCP), if required. Nevertheless, to overcome this drawback, the Successful Delivery Indication including the highest sequence number among a plurality of successfully delivered (not reported before) PDCP PDUs, may be enhanced by including the sequence number(s) of PDCP PDU(s) which could not be transmitted by the SeNB successfully to the UE. For example, assuming that PDCP PDUs 101-200 are still in the MeNB buffer (PDCP PDUs 0-100 were already reported on by the SeNB), the Successful Delivery Indication might then indicate the ACK_SN=150 and additionally NACK_SN1=140, NACK_SN2=145. In response to this Successful Delivery Indication, the MeNB would discard PDCP PDUs with sequence numbers 101-150, except for those with sequence numbers 140 and 145. As will be explained later, a further improvement then would allow the MeNB to decide whether or not to transmit the PDCP PDUs 140 and 145 directly to the UE (see below in connection with FIGS. 25 and 26).

As a further alternative the Successful Delivery Indication may comprise a bitmap, according to which the ACK_SN is included for the most recent or oldest not yet reported PDCP PDU that was successfully delivered to the UE together with 1-bit information for each subsequent or preceding PDP PDUs. For example, the Successful Delivery Indication can be composed as follows:

STARTING with the oldest PDCP PDU that was successfully delivered AND the delivery success for this PDU has not been indicated to MeNB before; and ENDING with the most recently successfully delivered PDCP PDU.

All the successfully delivered PDUs are indicated by "1" and others by "0"; or vice versa.

This alternative might cause less X2 signaling than previous alternatives, however it may become inefficient since an update of a previous report might become necessary. For instance, a particular PDCP PDU was reported to not have been successfully transmitted (at the time of the previous Successful Delivery Indication), but in the meantime was successfully transmitted, with the result that the subsequent Successful Delivery Indication bitmap includes part of the same information as the first Successful Delivery Indication.

Other possibilities could be to combine one or more of the previous alternatives for the Successful Delivery Indication, e.g., by indicating the oldest (or most recent) PDCP PDU that was successfully delivered (or not successfully delivered) and additionally transmitting a corresponding bitmap as presented above.

Apart from the format and content of the Delivery Success Indication, the timing as to when the Successful Delivery Indication is transmitted from the SeNB to the MeNB must be defined, and can be for example one of the following.

Event Triggered, e.g., based on events like:
Receiving (RLC) Status Report in SeNB from the UE;
MeNB asking for Delivery Success Indication (e.g., when MeNB buffers are exceeding a certain level, timer based etc.)
Size of Bitmap is fixed and bitmap is fully used (so that if bitmap has a size 'n' then 'n' number of PDCP PDU feedback information is actually carried)

Alternatively or additionally, the Successful Delivery Indication can be transmitted periodically, where the periodicity may be e.g., configurable.

Figure 25:
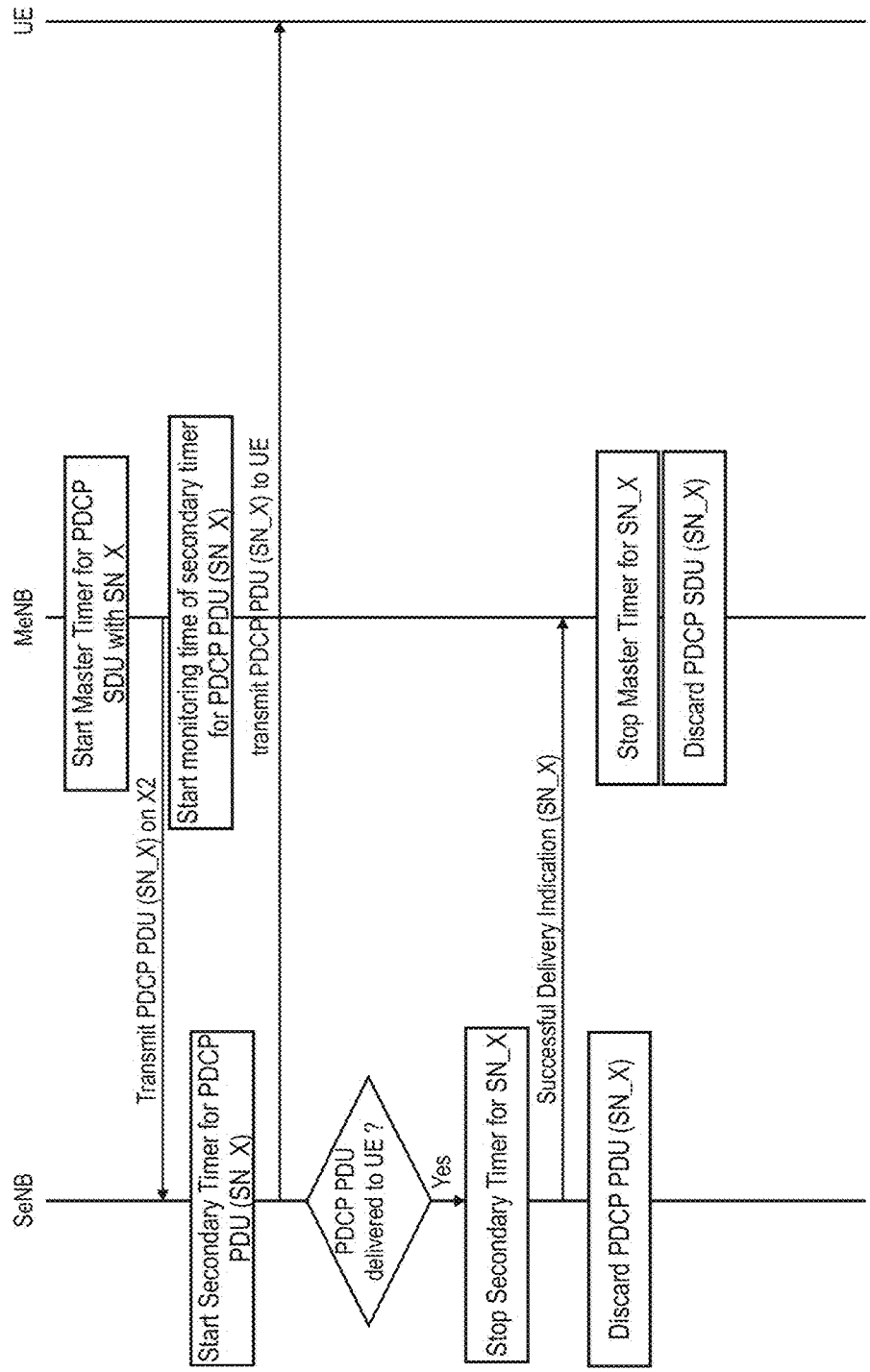
FIGS. 25 and 26 are a signaling diagram illustrating an improvement to the first embodiment according to which the MeNB can determine whether or not to transmit an additional re-transmission directly to the UE for particular PDCP PDUs which the SeNB could not successfully transmit to the UE.
Figure 26:
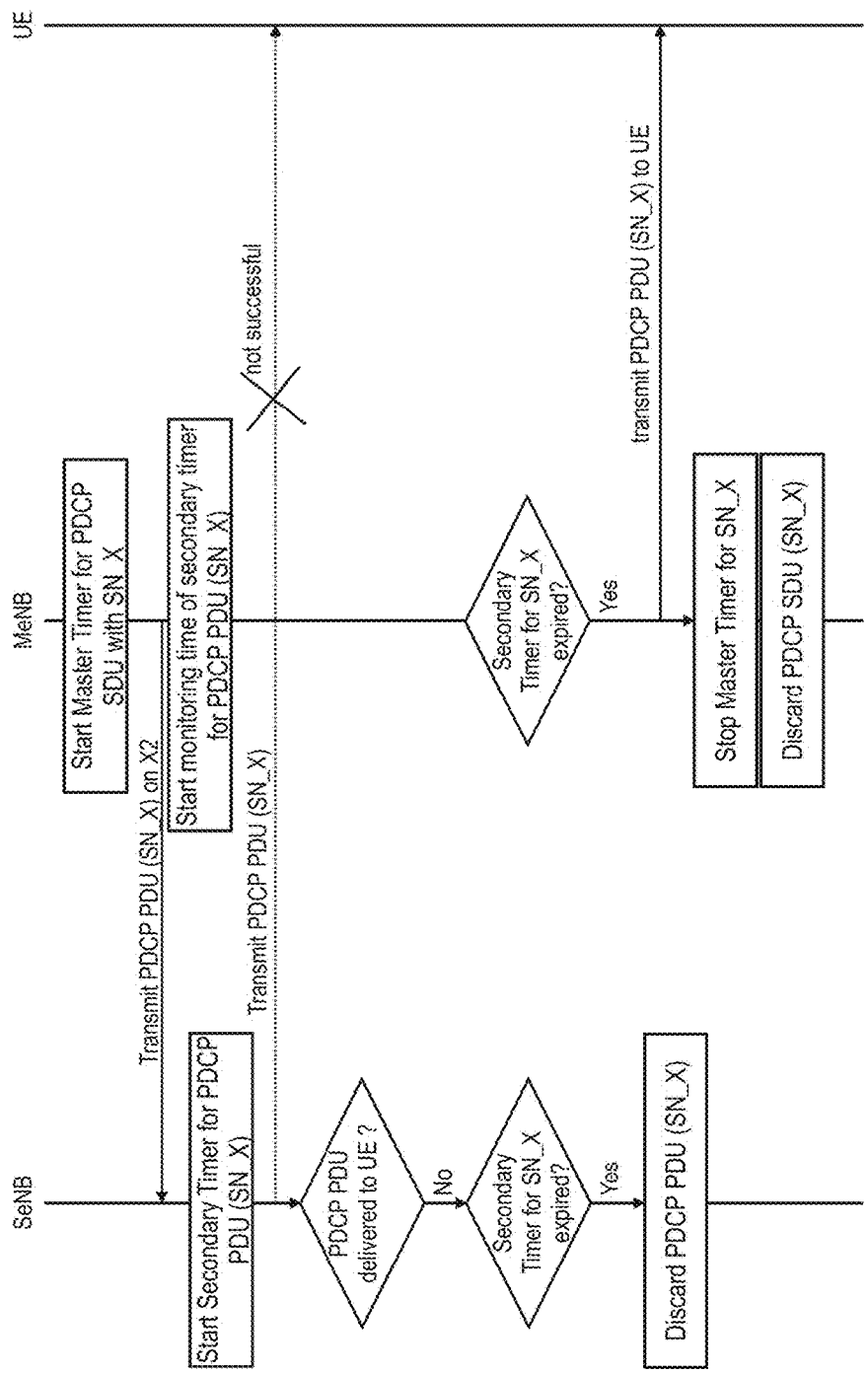

A further improvement will be explained in connection with FIGS. 25 and 26, which are diagrams schematically illustrating various steps performed at the SeNB, MeNB and UE focusing on the further improvement that will be explained in the following. It should be noted that FIGS. 25 and 26 are simplified so as to better illustrate the further improvement. According to this improvement, the MeNB is provided with the possibility to additionally transmit a PDCP PDU directly to the UE, in case the SeNB does not succeed in transmitting this PDCP PDU to the UE itself, e.g., by using the time window between the expiry of the secondary timer at the SeNB and the expiry of the Master Timer at the MeNB for a direct transmission to the UE. As explained before in connection with the First Embodiment, the Secondary Timer at the SeNB may be configured such that it factors in some—but in reality not all—of the delays incurred by the PDCP PDU reaching the SeNB and triggering the Secondary Timer (when compared to Master timer value triggered by the reception of the PDCP SDU). Consequently, the Secondary Timer shall expire before the corresponding Master Timer at the MeNB for the same PDCP PDU/SDU.

In more detail, it is assumed that the MeNB also monitors the time as configured for the secondary timer at the SeNB, such that the MeNB knows at which time the secondary timer at the SeNB for a particular PDCP PDU will expire. Furthermore, the MeNB may also factor in the time the Successful Delivery Indication takes to reach the MeNB, such that the time monitored at the MeNB needs to be a bit longer so as to be able to receive the corresponding Successful Delivery Indication from the SeNB; in other words, the MeNB knows at which time a Successful Delivery Indication for a particular PDCP PDU should have been received at the latest. In FIGS. 25 and 26 any of the above variants is circumscribed as "Secondary Timer for SN_X expired?". In one implementation, the MeNB starts monitoring the time of the Secondary Timer upon transmitting the PDCP PDU (SN_X) to the SeNB, as exemplified in FIGS. 25 and 26. In any case, the MeNB monitors the time value of the Secondary timer, which ends before the Master Timer for the PDCP PDU expires. In another implementation not shown in the figures, the MeNB monitors the timer value of the Master Timer (considering the various delays), to determine at which time of the Master Timer the Secondary Timer will presumably have expired.

FIG. 25 shows the case where the SeNB is able to successfully transmit the PDCP PDU to the UE. Correspondingly, the SeNB transmits a Successful Delivery Indication to the MeNB with respect to the PDCP PDU and discards the corresponding PDCP PDU. The MeNB upon receiving the Successful Delivery stops the corresponding Master Timer for the PDCP SDU (SN_X) and discards the PDCP SDU/PDU (SN_X). FIG. 26 shows the converse case where the SeNB is not able to successfully transmit the PDCP PDU to the UE. Consequently, the Secondary Timer at the SeNB for the PDCP PDU (SN_X) expires eventually, and the SeNB discards the PDCP PDU (SN_X); correspondingly, no Successful Delivery Indication is transmitted by the SeNB to the MeNB for this PDCP PDU. As explained for this improvement, the MeNB also monitors the time as configured for the Secondary Timer at the SeNB (with the possible adjustment for the delay incurred by the Successful Delivery Indication to be received at the MeNB), and thus knows when the MeNB should have received at the latest the Successful Delivery Indication for the PDCP PDU (SN_X). When the MeNB determines that a Successful Delivery Indication was and will not be received from the SeNB anymore ("Secondary Timer for SN_X? YES) and before the Master Timer expires (i.e., the Master Timer is still running and has not expired), the MeNB can decide to directly transmit the PDCP PDU (SN_X) to the UE. Shortly after, the Master Timer at the MeNB for this PDCP PDU (SN_X) will expire or will be stopped by the MeNB, and the corresponding PDCP SDU (SN_X) and PDCP PDU (SN_X) will be discarded at the MeNB.

Alternatively, the Successful Delivery Indication may include the NACK_SN(s) of PDCP PDUs, in response to which the MeNB can decide to transmit the corresponding PDCP PDUs to the UE.

For this improvement to be more advantageous, the Master Timer shall be smaller than the value of the PDCP reordering timer at the UE. If this is not the case, i.e., the reordering timer in the UE is configured smaller than the Master timer at the MeNB, then the direct transmissions by the MeNB may be received after the reordering timer for the PDCP PDU expires in the UE, in which case the UE, even after receiving the packet successfully, will simply discard it. However, since the MeNB is configuring the reordering timer to the UE (or if the same is specified), MeNB can ensure that the Master timer is smaller than the reordering timer running in the UE.

For this improvement it is advantageous, although not strictly necessary, if the Successful Delivery Indication is transmitted to the MeNB in a short time after successfully transmitting the PDCP PDU to the UE. Otherwise, since the MeNB will not receive the Successful Delivery Indication until approximately the time the Secondary Timer expires, the MeNB may wrongly assume that the SeNB could not transmit the PDCP PDU to the UE, and will in consequence transmit on its own the PDCP PDU to the UE (see FIG. 26). In any case, the UE should be prepared to discard duplicates PDCP PDUs in case it received the same PDCP PDU from both eNBs (SeNB and MeNB)

For a further improvement of the first embodiment, which can be considered as an alternative (or addition) to the previous improvement as explained in connection with connection to FIGS. 25 and 26, a Discard Indication between the SeNB and the MeNB is suggested, that will inform the MeNB about any PDCP PDU that was not successfully transmitted by the SeNB to the UE. Again, the SeNB may be configured by the MeNB how and when to transmit such a Discard Indication, i.e., when to start and stop reporting. For instance, the MeNB can ask the SeNB (on X2) to start reporting the Discard Indication for a particular bearer, and can ask the SeNB (on X2) to stop reporting for particular bearer(s).

One example of this improvement will be explained in the following with reference to FIG. 27. It is assumed that the SeNB upon reception of a PDCP PDU from the MeNB starts a Secondary Timer for the received PDCP PDU. Upon expiry of the Secondary Timer, the SeNB discards the PDCP PDU (RLC SDU), aborts transmission (for example if said PDCP PDU was not already mapped to a RLC PDU), and informs the MeNB about the discard, e.g., by using a Discard Indication as explained in the following. The MeNB in response can decide to transmit the PDCP PDU to the UE in case the Mater Timer is still running for this PDCP PDU; this will likely be the case, in view of that the Secondary Timer expires before the Master Timer when it is configured to adjust to some but not all of the various delays incurred between triggering the Master Timer and triggering the Secondary Timer.

The SeNB may also decide to discard a particular PDCP PDU, before expiry of the secondary timer, e.g., when the particular PDCP PDU was already (re)transmitted many times by SeNB RLC.

The Discard Indication as used in this improvement can be implemented in various ways, similar to the above introduced Successful Delivery Indication. For instance, the Discard Indication can be transmitted from the SeNB to the MeNB for each PDCP PDU which could not be transmitted successfully to the UE (e.g., for which the Secondary Timer expired or where the maximum number of retransmissions has been reached). This has the advantage that the MeNB will be informed as soon as possible (and thus before expiry of the corresponding Master Timer at the MeNB), and the MeNB will unambiguously learn about which PDCP PDUs were not received by the UE. The signaling burden on the X2 interface will presumably not be very high, considering that such a Discard Indication from the SeNB to the MeNB will only be necessary for a very small number of PDCP PDUs (in the order of $10^6$ after RLC retransmission).

With respect to when to send the Discard Indication, there are also various implementations, some of which have been already discussed with regard to the Successful Delivery Indication. For instance, the transmission of the Discard Indication may be event triggered; e.g., when at least one Secondary Timer for a PDCP PDU expires or when the number of successful deliveries exceeds a certain threshold like for every 50 successful deliveries; (the SeNB may send one Discard Indication to MeNB containing 1 ACK_SN and zero or more NACK_SN(s)). Alternatively, the transmission of the Discard Indication may be periodic; in this kind of reporting a Discard Indication is allowed to indicate NULL discard, when none of the PDCP PDU are discarded in the SeNB (i.e., all the PDCP PDUs in this reporting period were successfully transmitted to the UE before the corresponding Secondary Timer expired). This NULL discard can be indicated e.g., by including only the 1 ACK_SN as previously described or with the help of a special field indicating e.g., that all PDUs received on X2 so far have been delivered.

Nevertheless, also other implementations of the Discard Indication and when to transmit it are possible if deemed appropriate, such as those discussed for the Successful Delivery Indication (please refer to the above explanation e.g., with regard to highest sequence number).

In summary, the MeNB can perform a re-transmission directly to the UE if considered advantageous (effectively, this may be done only if the Master Timer is still running; the PDCP PDU is still available in the MeNB). The UE PDCP shall discard the duplicate PDCP PDU, for the cases where it received the same PDCP PDU from both the SeNB and the MeNB. Thus, the PDCP DPU can be additionally retransmitted to the UE using a shorter link delay, when required.

The Discard Indication may be sent periodically by the SeNB to the MeNB, even to indicate just an ACK_SN and zero or more NACK_SN(s), to allow for a time clearing of the MeNB PDCP buffer.

In order to avoid un-necessary sending of the Discard Indication to the MeNB, a new Poll Trigger can be used by the SeNB and the UE. The new Poll Trigger should be associated with the expiry of the Secondary Timer (e.g., just before or after same) or any other discard mechanism at the SeNB (e.g., delivery counter based, as explained before). Polling is done by including a Poll bit, and upon reception of a Poll, the UE shall promptly send across the RLC Status Report to the SeNB. Correspondingly, the SeNB further updates the Discard Indication based on this information, e.g., does not send the Discard Indication for PDCP PDUs that are now confirmed as received in the UE based on the polled RLC Status Report.

The discard mechanism as explained above in connection with FIG. 24 can be made even more accurate by providing the RLC layer at the SeNB with time stamp information relating to the PDCP SDU/PDU as follows. According to one option, when the PDCP SDU is received in the PDCP layer of the MeNB and triggers the corresponding discard timer at the PDCP for this PDCP SDU, a time stamp is generated indicating the time of reception of the PDCP SDU; e.g., GPS timer, UTC time, frame number, subframe number etc. Correspondingly, when the PDCP PDU (generated out of this PDCP SDU) is transmitted to the RLC layer at the SeNB, this generated time stamp (relating to the very same PDCP SDU/PDU) is also provided to the SeNB. For instance, the time stamp information can be included in the header of the corresponding PDCP PDU forwarded over the X2 interface to the SeNB. Upon reception of the time stamp information and the PDCP PDU, the RLC layer can determine exactly when the discard timer at the PDCP layer will expire based on the previously configured discard timer value of the SeNB (especially when being configured the same as the discard timer in the PDCP layer of the MenB) and the received reception time information of the time stamp.

According to another option, the time stamp information can include information about how much time remains before the PDCP discard timer expires and thus triggers the PDCP layer to discard the PDCP SDU and PDU. The content of the time stamp differs based on which entity generates the time stamp and at what time. For instance, in case 76 ms remain for discard timer before expiry at the time the X2 protocol receives the packet from the MeNB. This information is included in the time stamp. Again, this information is provided to the RLC layer at the SeNB and thus can be used by the SeNB to determine the exact point in time when the discard timer in the RLC layer of the SeNB shall discard the received PDCP PDU.

As a result, the discard mechanism configured in the RLC layer of the SeNB can be even more accurately synchronized with the discard timer of the MeNB PDCP layer. In this particular case, it is also not necessary to adjust the discard timer of the SeNB RLC layer to somewhat less than the discard timer value of the MeNB PDCP discard timer to compensate for the delays involved for transmitting the PDCP SDU data from the MeNB to the SeNB. Instead, the discard timer at the SeNB RLC layer can be set to exactly the same value as the discard timer at the MeNB PDCP layer.

According to a further improvement which could be used together or alternatively to the above, the MeNB is motivated to transmit bearers/packets associated with a short discard timer itself, rather than transmitting such packets via the SeNB and thus incurring the backhaul link delay/congestion. This could provide a crucial input while selecting what bearers/packets should be served by the MeNB or SeNB. In particular, when communication links such as bearers are established between the MeNB, SeNB and the UE, bearers associated with packets having a small discard timer value are established by the MeNB directly with the UE (i.e., not going via the SeNB), whereas other bearers can be either established between the MeNB and UE or between the MeNB, SeNB and UE in the usual manner.

Second Embodiment

Figure 28:
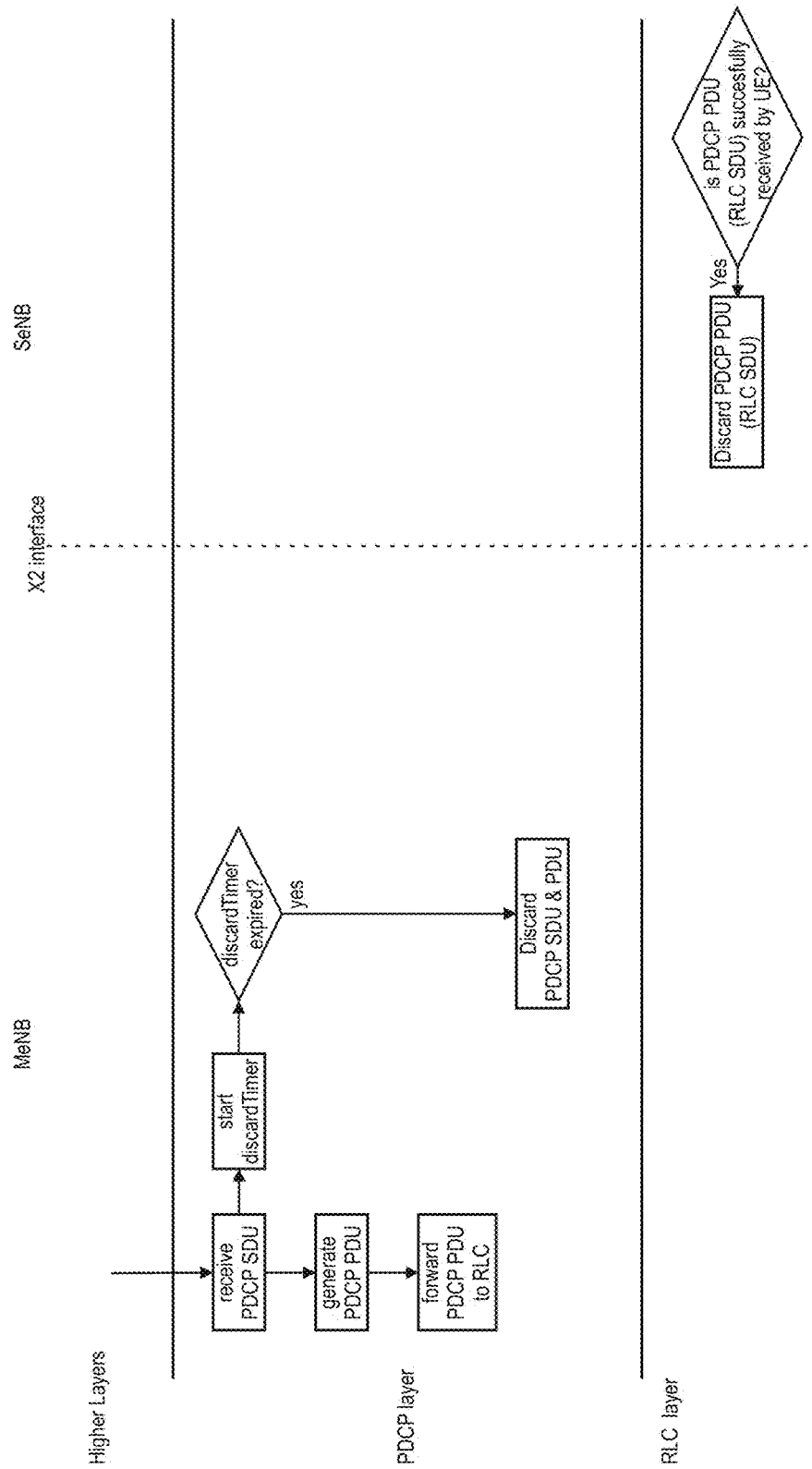
FIG. 28 is a flow diagram for illustrating the improved discard function according to a second exemplary embodiment.

The second embodiment deals with the same problem as the first embodiment, however provides a somewhat different and alternative solution as will be explained in connection with FIG. 28. Basically the same assumptions are made as in connection with the first embodiment explained above. In particular, a dual connectivity scenario in a small cell environment is assumed, where the UE is connected to both the MeNB and the SeNB, and at least receives data that is forwarded from the SGW to the MeNB, and finally via the SeNB to the UE, i.e., illustrated exemplary in FIGS. 21b, 21c as EPS bearer #2. As indicated, EPS bearer #2 can either be split in the MeNB such that the bearer can be transmitted via both eNBs as needed (FIG. 21c) or is not split in the MeNB but separately forwarded from EPS bearer #1 (FIG. 21b).

According to the small cell discussion in 3GPP, different user plane architectures have been under discussion as explained in the background section with reference to FIG. 22. For the second embodiment it is assumed that the user plane architecture of MeNB and SeNB is such that the PDCP layer with the discard function is located at the MeNB but not at the SeNB; furthermore, the lower RLC layer shall be located at the SeNB and may or may not be located at the MeNB. Correspondingly, the present second embodiment may refer to any of the discussed user plane architectures of FIGS. 22c, 22d, 22e, 22g, 22h, 22i. In the user plane architectures of FIGS. 22c (Alternative 2B) and 22g (Alternative 3B), where the PDCP layer is split between the MeNB and SeNB, it is not clear which functions are actually located in the MeNB and which function in the SeNB; what is relevant to the second embodiment is that the discard functionality of the PDCP is located at the MeNB and thus away from the RLC layer discard functionality, making it necessary in the prior art to have inter-layer communication which goes between the MeNB and the SeNB (see problem description).

The PDCP and RLC functionality, which in the first embodiment is respectively located at the MeNB and SeNB, shall remain mostly the same as explained in the background section (e.g., with reference to FIGS. 10, 11, 12) and as defined by current 3GPP standards; except for the following changes which relate to the second embodiment. Also the second embodiment suggests an improved discard functionality mechanism between the PDCP and RLC layer, i.e., between MeNB and SeNB.

As in the prior art and for the first embodiment, the PDCP layer at the MeNB implements a discard mechanism which allows discarding those PDCP SDUs (and corresponding PDCP PDUs) which transmission is not necessary anymore because the corresponding PDCP timer is expired. However, unlike the prior art discard mechanism and similar to the first embodiment, the discard mechanism in the PDCP layer of the MeNB according to the second embodiment does not check whether a PDCP PDU was forwarded to the RLC layer and does not indicate the discard of the PDCP SDU to the lower layer, RLC, at the SeNB. Furthermore, to simplify the SeNB, a separate discard mechanism as suggested by the first embodiment is not implemented in the SeNB.

Therefore, when the PDCP layer at the MeNB receives a PDCP SDU, it will start a corresponding discard timer for said PDCP SDU, and will also process the PDCP SDU in the usual manner to generate a PDCP PDU, which will then be forwarded to the RLC layer of the SeNB for further transmission to the UE. When the RLC layer of the SeNB receives the PDCP PDU via the X2 interface from the PDCP layer at the MeNB, it will not start an own particular and additional discard timer as with the first embodiment, but will just proceed with the normal RLC operation of segmentation, concatenation of received data into RLC PDUs, which are then forwarded to the lower layers (e.g., MAC) for further transmission. Also the RLC layer at the SeNB will not have functionality for receiving an indication from the PDCP layer at the MeNB so as to discard a previously received PDCP PDU. As a consequence, even if the PDCP discard timer has expired at the MeNB, the RLC layer will continue its usual process of generating RLC PDU(s) for transmission to the UE. Therefore, it may even be that the RLC layer will report to the PDCP layer at the MeNB successful reception at the UE, for PDCP PDUs which have long been already discarded by the PDCP layer at the MeNB.

Of course the RLC layer may or may not have another internal discard timer (different from the timer of the first embodiment) ensuring that the RLC at the SeNB will not try successfully forwarding the received PDCP PDU data (in form of one or more RLC PDUs) to the UE for a long time until it actually succeeds.

As exemplary illustrated in FIG. 28, the RLC layer at the SeNB will have usual routines to clear its buffers by discarding PDCP PDUs (i.e., RLC SDUs, and possibly RLC PDUs) that have been successfully transmitted to the UE and thus do not need to be kept for later use.

This discard mechanism of the second embodiment is simple from an implementation point of view, and thus allows making the SeNB simpler and thus less expensive since it does not need to handle the multiple concurrent timers (especially for high data rate applications), one per PDCP PDU, and also since RLC now has the same behavior for all the PDCP PDUs that it receives on X2. The second embodiment has also the advantage of not requiring signaling per packet (PDCP PDU) for informing the discard timer to the SeNB and also any configuration/reconfiguration of such functionality/timer value is avoided. Also a corresponding check in the MeNB as to whether the data was already forwarded to the SeNB RLC layer or not, is not necessary any more.

An improvement for the second embodiment allows the possibility for the MeNB to transmit the PDCP PDU directly to the UE, so as to cover for the case that the SeNB was not able to transmit the PDCP PDU successfully to the UE (e.g., before expiry of an internal discard timer; similar to the improvement for the first embodiment described in connection with FIGS. 25 and 26). As already explained for the second embodiment, the RLC layer will report to the PDCP layer at the MeNB the successful transmission of the PDCP PDUs to the UE. This may be done in a similar manner as described for the first embodiment with respect to the Successful Delivery Indication. It is hereby refrained from repeating the various possible formats, contents and transmission instances possible for such a Successful Delivery Indication; accordingly, it is referred herewith to the corresponding passages for the first embodiment which are equally applicable for informing by the RLC layer at the SeNB the PDCP layer of the MeNB about a successful transmission of one (or more) PDCP PDUs to the UE.

According to this improvement of the second embodiment, the MeNB determines whether or not a corresponding Successful Delivery Indication was received for a particular PDCP PDU until a certain point in time (but before expiry of the corresponding Master Timer at the MeNB for this same PDCP PDU). In case the Successful Delivery Indication was not received in the MeNB until this certain point in time, it may decide to transmit the PDCP PDU to the UE directly.

Third Embodiment

The third embodiment deals with an improvement to the UE processing, and thus can be implemented independently from or additionally to the first and second embodiments.

Typically, the SeNB link will have higher latency since the packet sent from the UE to the SeNB will have to go to the MeNB via the X2 interface, thus undergoing at least the backhaul link latency. This does apply less to the dual connectivity mode of FIG. 21b where the different bearers are served by different eNBs; but in the dual connectivity mode of FIG. 21c, the same bearer #2 is served by both eNBs, such that some packets of the bearer are sent via the MeNB and other via the SeNB in the uplink and downlink. The decision as to via which route the packet shall be sent, can for example depend on the real time load, radio situation etc.

According to the third embodiment, the decision by the UE as to whether to transmit a PDCP PDU directly to the MeNB or to transmit the packet to the SeNB (so as to be forwarded to the MeNB) shall take into account the discard timer at the PDCP layer of the UE.

The UE may not know about the nominal backhaul link latency and/or flow control delay between MeNB and SeNB. This information can either be signaled by the network directly to the UE, or the UE can try estimating this value over a period of time by e.g., observing the difference in reception time of e.g., subsequent PDCP PDUs received via the different nodes. An average of such difference should represent the nominal backhaul delay, and the UE can use this value, advantageously with some allowance for an estimation error.

Thus, the UE has the necessary information on the backhaul delay (optionally also the flow control delay).

In particular, the UE could for example decide to use the transmission opportunities in the Macro link to the MeNB for packets that have already suffered a longer delay (e.g., due to window stalling, lack of grant or other reasons).

The UE compares the remaining discard time for a PDCP PDU against the backhaul delay and/or flow control delay and decides to transmit the PDCP PDU directly to the MeNB so as to avoid the detour via the SeNB in case the remaining discard time is comparable or less than the backhaul link delay and/or flow control delay.

Or, the UE may decide to not transmit the packets on the SeNB link to the SeNB in case the remaining discard time is comparable to or less than the backhaul link delay (optionally in addition with the flow control delay; see above discussion for first embodiment).

Consequently, if there is no transmission opportunity/grant available in the macro link, then the UE may rather wait for a transmission opportunity/grant available in the macro link to transmit the PDCP PDU and may have to then discard the PDCP PDU upon discard timer expiry in case no transmission opportunity/grant in the macro link was available in time.

Fourth Embodiment

A still further, fourth, embodiment improves the discard functionality of the PDCP layer, in those cases where the PDCP discard mechanism is located at the SeNB. In connection with the first embodiment, the effectivediscardTimer of the RLC layer at the SeNB was explained as compensating for the various delays incurred by a data packet being transmitted from the MeNB to the SeNB.

Similarly, the fourth embodiment suggests using an effectivediscardTimer for the PDCP discard functionality in the SeNB. Consequently, when higher layers of the MeNB configure the discard functionality of the PDCP layer at the SeNB, a discard timer value will be determined that compensates for the delay(s), such as the backhaul link delay and flow control delay (see first embodiment for explanation of backhaul link delay and flow control delay).

Accordingly, this fourth embodiment applies to user plane architectures where the PDCP layer, and in particular the discard mechanism, is located at the SeNB too; such as Alternative 2A and 3A (see FIGS. 22b and 22f), and possibly Alternatives 2B and 3B in case the PDCP layer at the SeNB (not at the MeNB) includes the discard functionality (see FIGS. 22c and 22g).

Figure 3:
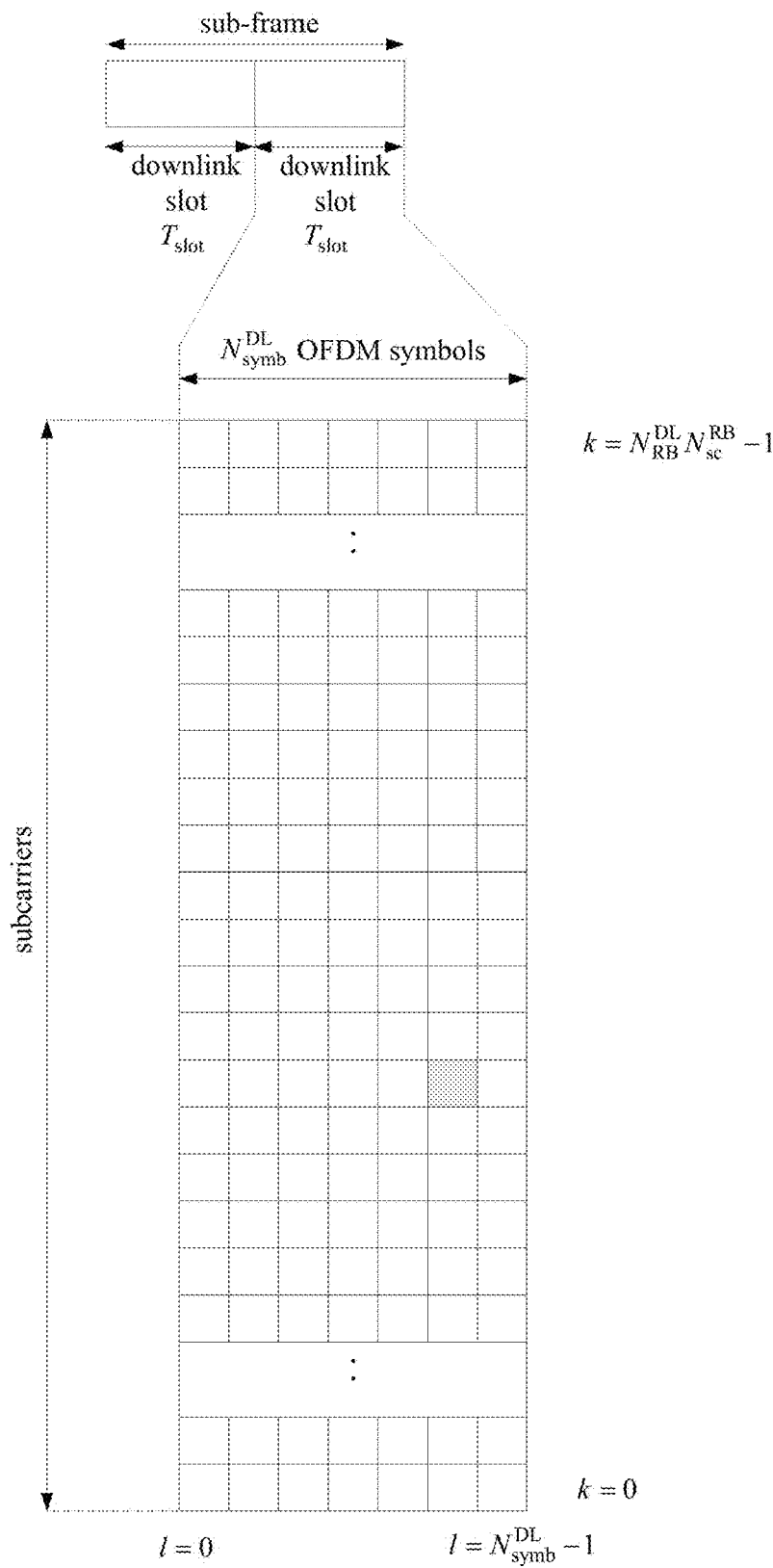
FIG. 3 shows exemplary subframe boundaries on a downlink component carrier as defined for 3GPP LTE (Release 8/9)
Figure 4:
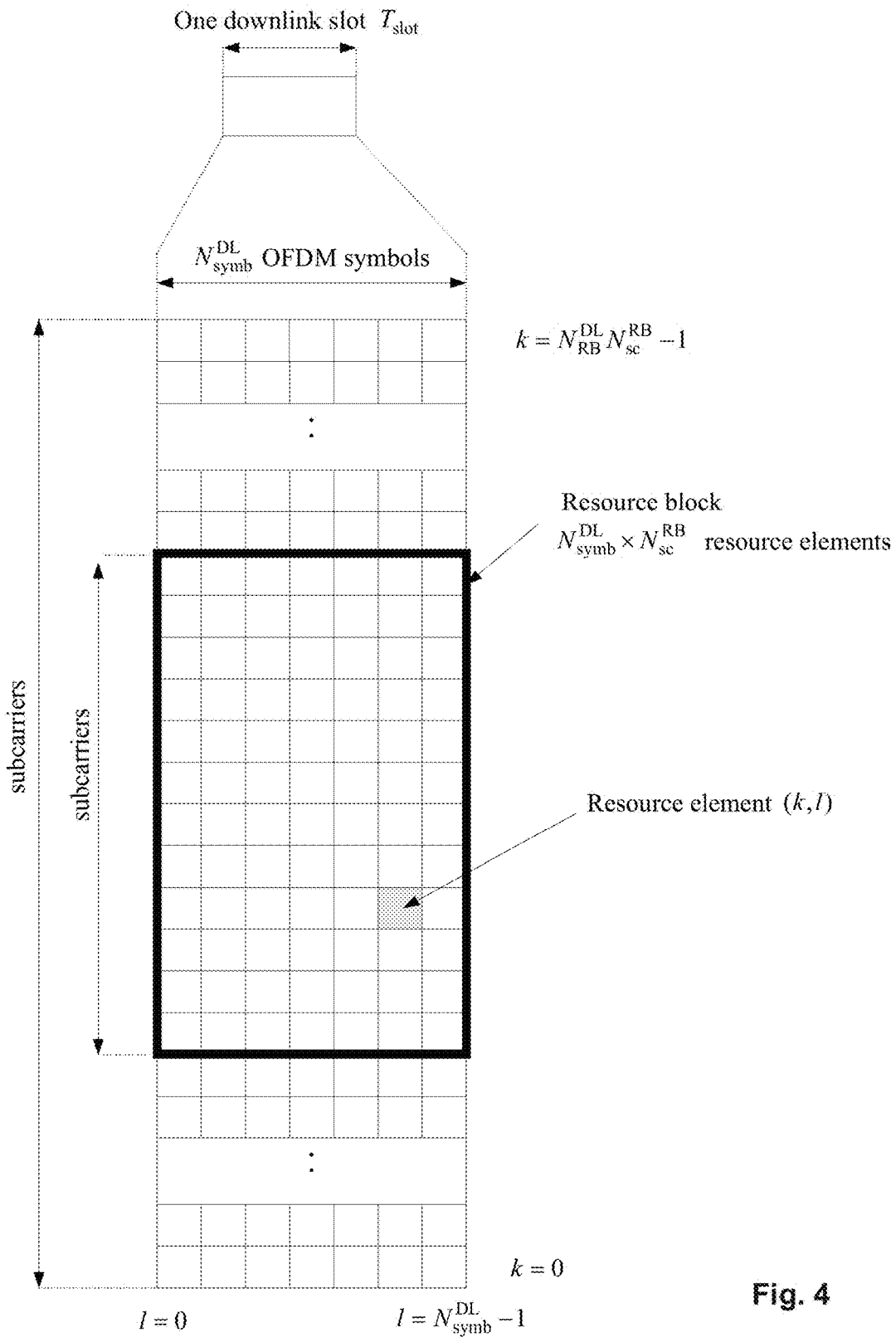
FIG. 4 shows an exemplary downlink resource grid of a downlink slot as defined for 3GPP LTE (Release 8/9)
Figure 5:
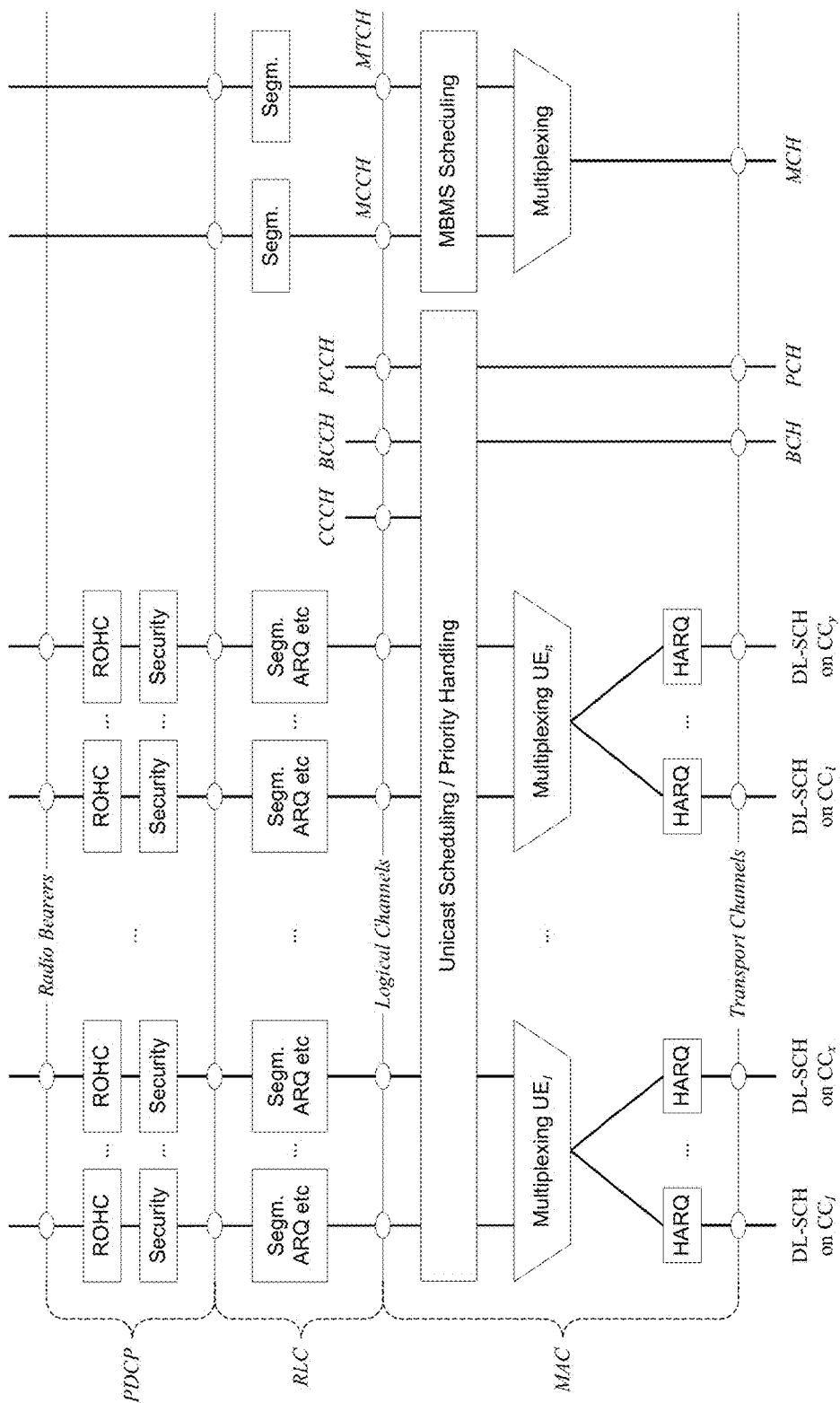
FIGS. 5 and 6 show the 3GPP LTE-A (Release 10) Layer 2 structure with activated carrier aggregation for the downlink and uplink, respectively.
Figure 6:
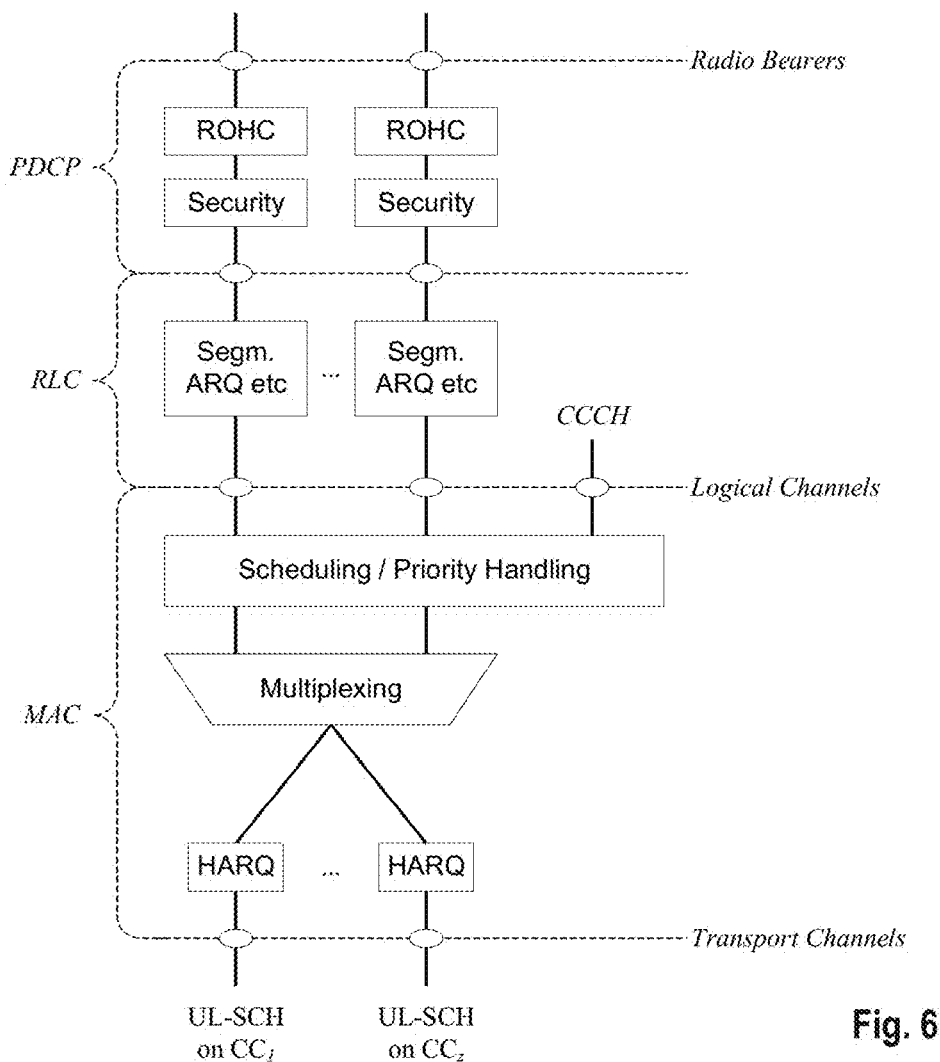
Figure 7:
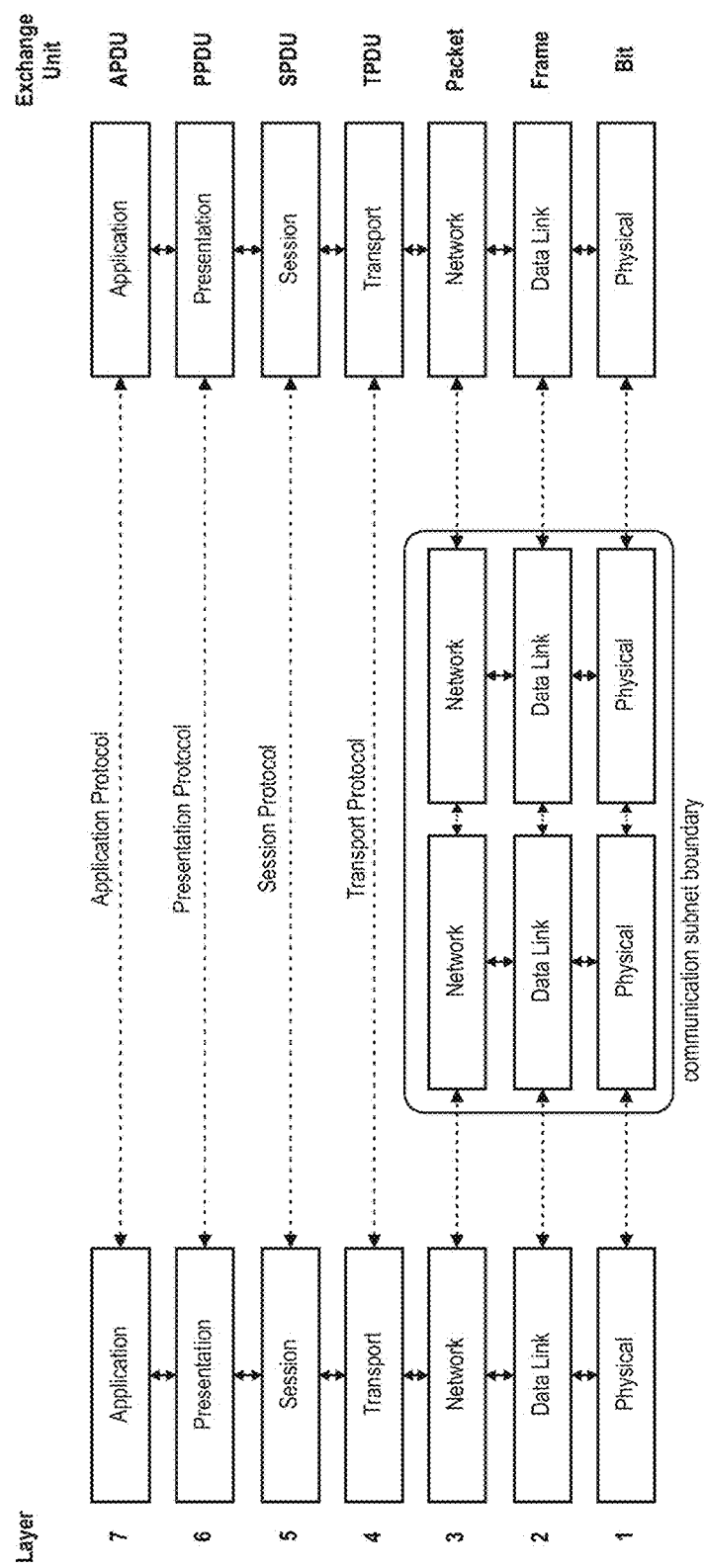
FIG. 7 illustrates the OSI model with the different layers for communication.
Figure 8:
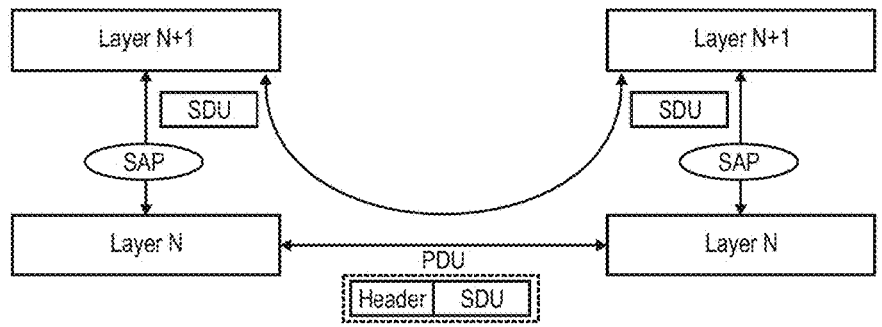
FIG. 8 illustrates the relationship of a protocol data unit (PDU) and a service data unit (SDU) as well as the inter-layer exchange of same.
Figure 9:
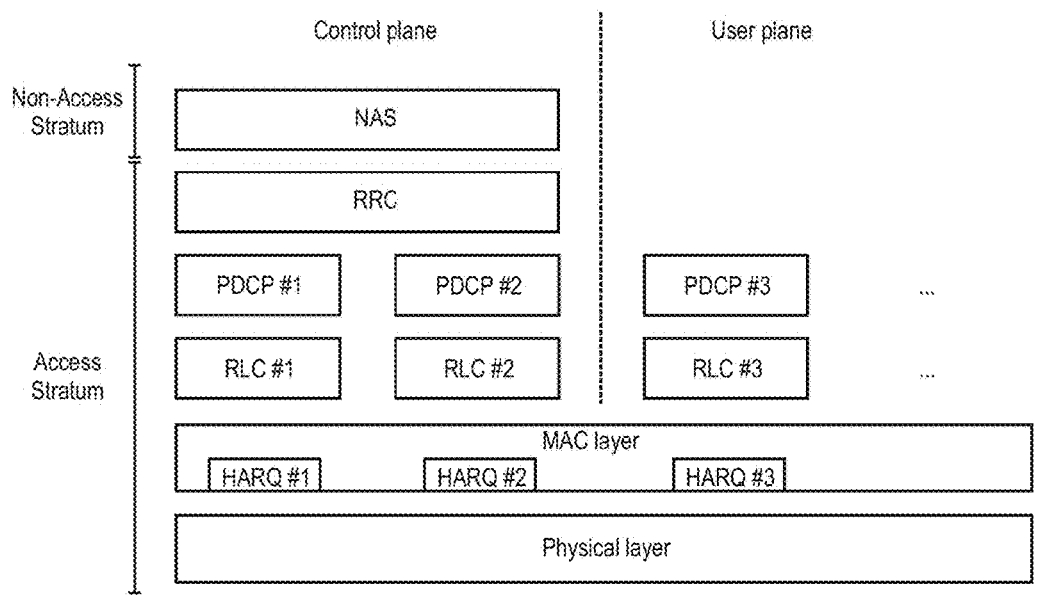
FIG. 9 illustrates the layer 2 user and control-plane protocol stack composed of the three sublayers, PDCP, RLC and MAC, FIG. 10 gives an overview of the different functions in the PDCP, RLC and MAC layers as well as illustrates exemplary the processing of SDUs/PDUs by the various layers.

For the dual connectivity modes where one bearer is served by both the SeNB and the MeNB and the corresponding user plane architecture, a PDCP layer is located in the MeNB as well as in the SeNB (see FIG. 3A). According to the present fourth embodiment, the discard timer at the PDCP layer of the MeNB for the particular bearer is different (i.e., higher timer value) than the discard timer at the PDCP layer of the SeNB for the same particular bearer; i.e., the discard timer value at the PDCP layer of the SeNB is lower by the amount of delay that shall be considered, e.g., the backhaul link delay and/or the flow control delay.

This has the advantage that the packet delay on the X2 is nullified due to slow backhaul and/or the flow control delay which means that the discard functionality in PDCP works exactly as desired and PDCP discard happens in the same timeline (as in MeNB) from the higher layer/application perspective. If the discard timer in the SeNB has the same value as in MeNB then Access Stratum will keep trying to transmit the packet even when the higher layer/application already stop expecting it.

Fifth Embodiment

This fifth embodiment has a different approach for the discard functionality of the PDCP layer at the MeNB. As with the first embodiment, a Secondary Timer is configured at the SeNB (e.g., according to one of the plurality of variants disclosed in connection with the first embodiment described above). On the other hand, the PDCP layer has no Master Timer defined, contrary to the previous embodiments; consequently, the PDCP layer does not trigger the Master Timer upon reception of a PDCP SDU.

The discard mechanism at the MeNB is instead controlled by a Discard Indication received from the SeNB, informing the MeNB about the PDCP PDU (and its SN) which could not be successfully delivered by the SeNB to the UE. The Discard Indication and various implementations thereof were already discussed in great detail in connection with one improvement of the first embodiment, and will not be fully repeated here, since it is applicable to this fifth embodiment in the same manner.

Consequently, upon receiving a Discard Indication for one or more particular PDCP PDUs, the MeNB can deduce which of them were and were not correctly received by the UE. Correspondingly, the MeNB can discard the PDCP PDUs on that basis and has no need for the Master Timer for the PDCP SDUs anymore.

For instance, the Discard Indication from the SeNB can be implemented as including the highest sequence number of PDCP PDUs successfully delivered to the UE, for example in addition to the NACK SNs of those PDCP PDUs that could not be successfully delivered to the UE.

Alternatively, the Discard Indication can be implemented by using a bitmap, exemplary as follows. The bitmap starts with the oldest Discarded PDCP PDU for which the "Secondary Timer" has expired AND the discard for this PDU has not been indicated to the MeNB before AND another time (e.g., termed ReportingTimerA) has not expired. This ReportingTimerA can be started with the Secondary Timer, and has a value less than the UE PDCP Reordering timer but higher than the Secondary Timer. The ReportingTimerA shall control the transmission timing of the Discard Indication bitmap. The Discard Indication bitmap ends with the most recently Discarded PDCP PDU, i.e., for which the Secondary Timer has expired. All the discarded PDUs in the bitmap can be indicated by "1" and all successfully delivered by "0", or vice versa.

Instead of using a bitmap, the Discard Indication could also be a list of discarded PDCP PDUs (e.g., NACK SN(s)) for which the Secondary Timer has expired but not the ReportingTimerA AND the discard for this PDU has been indicated to the MeNB before. In a further example, an ACK_SN of the highest successfully delivered PDCP PDU is additionally reported to the MeNB, such that the MeNB may clear its buffer accordingly. The SeNB would thus report to the MeNB the NACK_SN(s) together with an ACK_SN of the highest successfully delivered PDCP PDU.

Sending the Discard Indication can be triggered by any event, such as the expiry of at least one Secondary Timer, or can be periodic.

Figure 27:
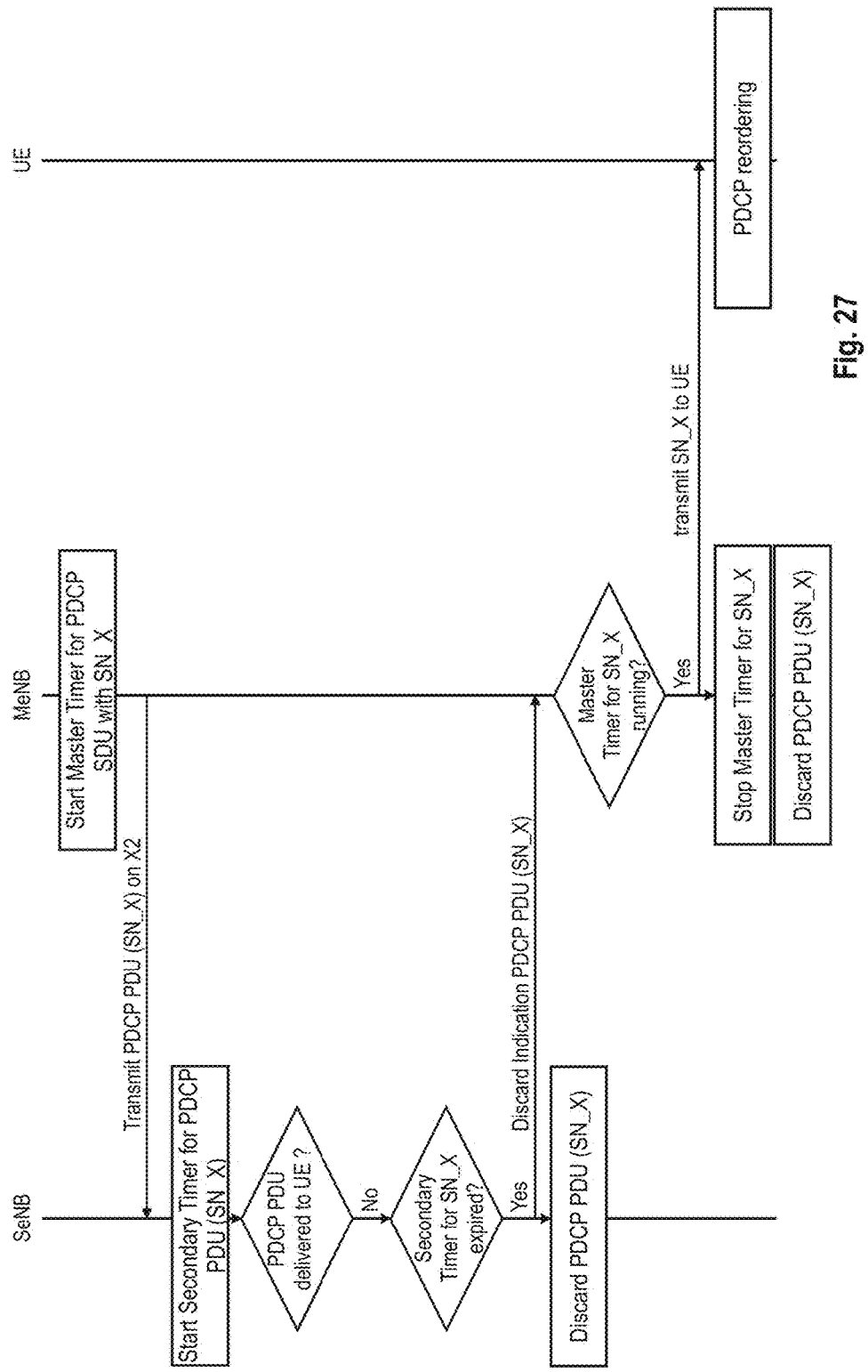
FIG. 27 is a signaling diagram exemplary illustrating an improvement according to which a Discard Indication is transmitted from the SeNB to the MeNB, for PDCP PDUs which could not be transmitted by the SeNB to the UE.

As a further improvement (similar to the corresponding improvement of the first embodiment, see FIG. 27), the MeNB can, upon receiving the Discard Indication, decide whether or not to directly transmit the PDCP PDU, which was not successfully transmitted to the UE by the SeNB, to the UE. This has the advantage of a further retransmission done by the MeNB in place of the SeNB for the PDCP PDU, for which transmission to the UE done by the SeNB failed.

Figure 29:
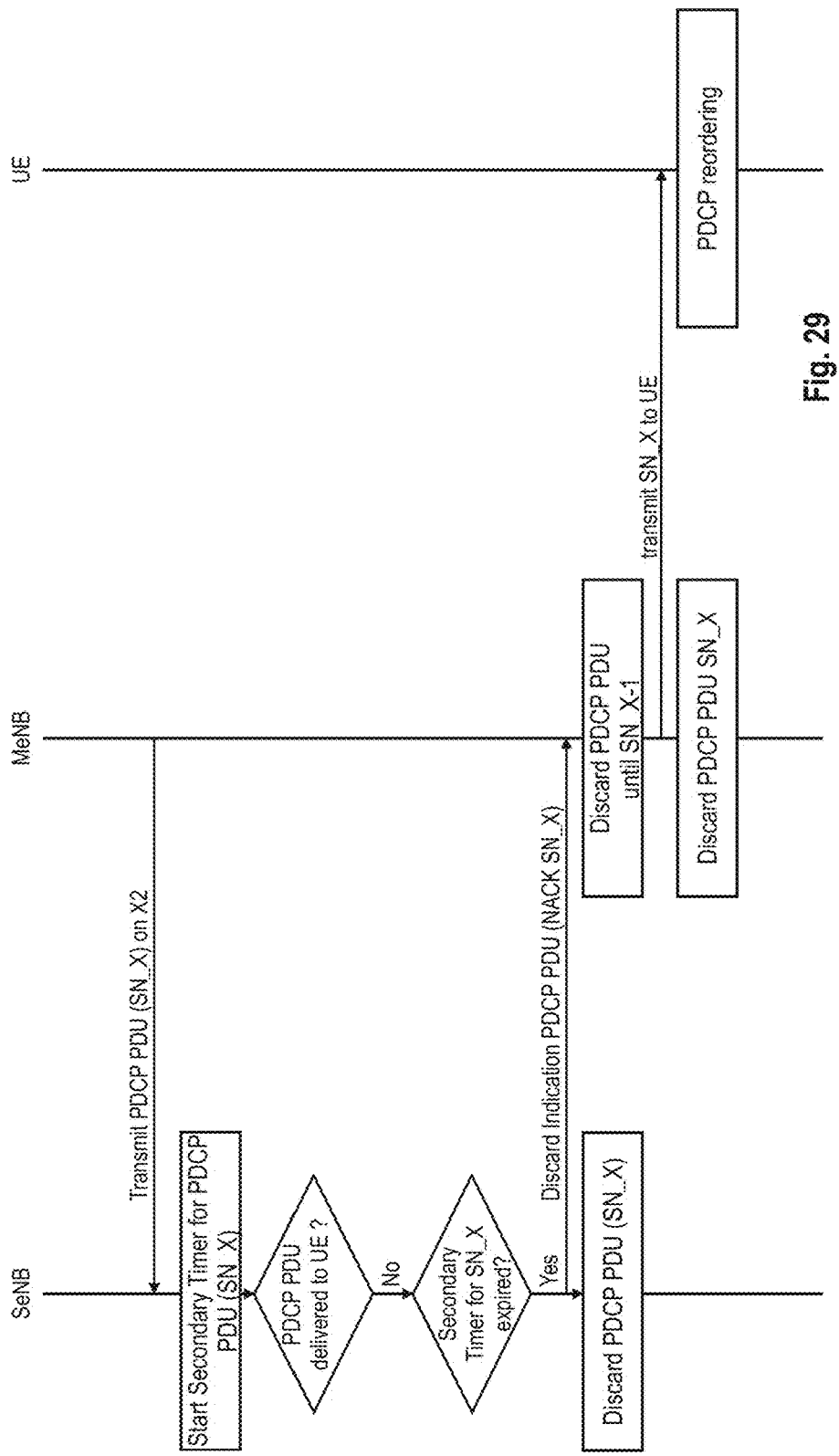
FIG. 29 is a flow diagram for illustrating improved discard function between SeNB and MeNB according to a fifth exemplary embodiment.

This is depicted in FIG. 29, which illustrates that the discard mechanism at the MeNB is working without a master timer, but mainly based on the Discard Indication received from the SeNB. For instance, in case the MeNB receives the Discard Indication indicating a NACK for PDCP PDU SN_X; in response the MeNB can discard PDCP PDUs until SN=X−1. The MeNB may then decide to directly transmit PDCP PDU SN_X to UE, and upon successfully doing may also discard PDCP PDU with SN_X.

Hardware and Software Implementation of the Present Disclosure

Another exemplary embodiments relate to the implementation of the above described various embodiments using hardware and software. In this connection a user equipment (mobile terminal) and a eNodeB (base station) are provided. The user equipment is adapted to perform the methods described herein.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment comprising:
control circuitry, which, in operation, controls connection with a master base station and connection with a secondary base station; and
a receiver, which is coupled to the control circuitry and which, in operation, receives data packets, which are transmitted from the master base station as PDCP PDUs (Packet Data Convergence Protocol, Protocol Data Units) to the secondary base station, from the secondary base station;
wherein, when the user equipment fails at receiving the data packets from the secondary base station, the secondary base station transmits to the master base station an indication including first information on the PDCP PDUs transmitted from the master base station and successfully delivered by the secondary base station to the user equipment and second information on the PDCP PDUs transmitted from the master base station and unsuccessfully delivered by the secondary base station to the user equipment,
wherein the first information includes a highest sequence number of the PDCP PDU successfully delivered by the secondary base station to the mobile station and the second information includes sequence numbers of an oldest lost PDCP PDU and a most recently lost PDCP PDU such that the sequence numbers indicate a range of consecutively lost PDCP PDUs, and
wherein the master station considers buffer capacity of the secondary base station in controlling the secondary base station.

2. The user equipment according to claim 1, wherein the indication is transmitted for respective bearers.

3. The user equipment according to claim 1, wherein the master base station removes buffered PDCP PDUs according to the first information on the successfully delivered PDCP PDUs.

4. A method implemented by a user equipment, the method comprising:
controlling connection with a master base station and connection with a secondary base station; and
receiving data packets, which are transmitted from the master base station as PDCP PDUs (Packet Data Convergence Protocol, Protocol Data Units) to the secondary base station, from the secondary base station;
wherein, when the user equipment fails at receiving the data packets from the secondary base station, the secondary base station transmits to the master base station an indication including first information on the PDCP PDUs transmitted from the master base station and successfully delivered by the secondary base station to the user equipment and second information on the PDCP PDUs transmitted from the master base station and unsuccessfully delivered by the secondary base station to the user equipment,
wherein the first information includes a highest sequence number of the PDCP PDU successfully delivered by the secondary base station to the mobile station and the second information includes sequence numbers of an oldest lost PDCP PDU and a most recently lost PDCP PDU such that the sequence numbers indicate a range of consecutively lost PDCP PDUs, and
wherein the master station considers buffer capacity of the secondary base station in controlling the secondary base station.

5. The method according to claim 4, wherein the indication is transmitted for respective bearers.

6. The method according to claim 4, wherein the master base station removes buffered PDCP PDUs according to the first information on the successfully delivered PDCP PDUs.

* * * * *

UNITED STATES PATENT AND TRADEMARK OFFICE
CERTIFICATE OF CORRECTION

Page 1 of 1

PATENT NO. : 10,425,346 B2
APPLICATION NO. : 15/922750
DATED : September 24, 2019
INVENTOR(S) : Prateek Basu Mallick et al.

It is certified that error appears in the above-identified patent and that said Letters Patent is hereby corrected as shown below:

In the Specification

Column 39, Claim 1, Line 29:
"secondary base station to the mobile station and the" should read, --secondary base station to the user equipment and the--.

Column 40, Claim 4, Line 24:
"secondary base station to the mobile station and the" should read, --secondary base station to the user equipment and the--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*